United States Patent
Wu et al.

(10) Patent No.: US 7,471,932 B2
(45) Date of Patent: Dec. 30, 2008

(54) SYSTEM AND METHOD FOR EMBEDDING OFDM IN CDMA SYSTEMS

(75) Inventors: Shiquan Wu, Nepean (CA); Wen Tong, Ottawa (CA); Peiying Zhu, Kanata (CA); Ming Jia, Ottawa (CA); Hua Xu, Nepean (CA); Daniel Boudreau, Hull (CA); Jianming Wu, Kanata (CA); Mo-Han Fong, L'Original (CA); Keith Edwards, Hutton (GB)

(73) Assignee: Nortel Networks Limited, St. Laurent (CA)

( * ) Notice: Subject to any disclaimer, the term of this patent is extended or adjusted under 35 U.S.C. 154(b) by 622 days.

(21) Appl. No.: 10/915,393

(22) Filed: Aug. 11, 2004

(65) Prior Publication Data

US 2005/0063345 A1 Mar. 24, 2005

Related U.S. Application Data

(60) Provisional application No. 60/493,800, filed on Aug. 11, 2003, provisional application No. 60/494,087, filed on Aug. 12, 2003.

(51) Int. Cl.
- *H04B 1/02* (2006.01)
- *H04B 7/00* (2006.01)
- *H04Q 7/20* (2006.01)
- *G01R 31/28* (2006.01)

(52) U.S. Cl. ............ 455/91; 455/519; 714/714; 375/130; 375/144; 375/145; 375/146; 375/147; 370/209; 370/321; 370/330; 370/335; 370/342

(58) Field of Classification Search .......... 714/714; 455/519, 91; 370/335, 320, 319, 209, 321, 370/342, 344; 375/130, 144, 145, 146, 147, 375/148, 224, 267

See application file for complete search history.

(56) References Cited

U.S. PATENT DOCUMENTS

| | | | |
|---|---|---|---|
| 5,239,557 A * | 8/1993 | Dent | 370/342 |
| 6,639,937 B2 * | 10/2003 | Doetsch et al. | 375/130 |
| 6,904,550 B2 * | 6/2005 | Sibecas et al. | 714/714 |
| 7,184,789 B2 * | 2/2007 | Leung et al. | 455/519 |
| 2002/0154678 A1 * | 10/2002 | Doetsch et al. | 375/130 |
| 2003/0193914 A1 * | 10/2003 | Lomp et al. | 370/335 |
| 2004/0071198 A1 * | 4/2004 | Lomp et al. | 375/148 |

(Continued)

FOREIGN PATENT DOCUMENTS

WO  WO 03 010901  6/2003

OTHER PUBLICATIONS

Wavecom, France Telecom, Nortel Networks, "Stand Alone Carrier—A High Speed Channel in Downlink", TSG-RAN Working Group 1. Feb. 27, 2001—Mar. 3, 2001. pp. 1-11. Las Vegas, USA. XP002219119. Retrieved from Internet: www.3gpp.org/ftp/tsg_ran/WG1_R1.1/tsgr1_19/Docs/PDFx/R1-01-0291.pdf.

(Continued)

*Primary Examiner*—William D Cumming

(57) ABSTRACT

Systems and methods of combining OFDM and CDMA signals are provided. An OFDM packet data channel is overlaid over CDMA transmissions. The channel is scheduled slot-wise between multiple users. In some embodiments, there is a CDMA packet data channel which is scheduled together with the OFDM packet data channel.

42 Claims, 17 Drawing Sheets

U.S. PATENT DOCUMENTS

| | | | |
|---|---|---|---|
| 2004/0141481 A1 | 7/2004 | Lee et al. | |
| 2004/0179500 A1* | 9/2004 | Ozluturk | 370/335 |
| 2004/0252668 A1* | 12/2004 | Ozukturk et al. | 370/335 |
| 2005/0094604 A1* | 5/2005 | Ozluturk et al. | 370/335 |
| 2005/0100115 A1* | 5/2005 | Sorrells et al. | 375/295 |
| 2005/0243897 A1* | 11/2005 | Lomp et al. | 375/146 |
| 2005/0265430 A1* | 12/2005 | Ozluturk et al. | 375/145 |
| 2006/0013168 A1* | 1/2006 | Agrawal et al. | 370/335 |
| 2006/0013186 A1* | 1/2006 | Agrawal et al. | 370/344 |
| 2006/0018279 A1* | 1/2006 | Agrawal et al. | 370/330 |
| 2006/0018629 A1* | 1/2006 | Agrawal et al. | 370/321 |
| 2006/0280231 A1* | 12/2006 | Sorrells et al. | 375/147 |
| 2007/0104253 A1* | 5/2007 | Luo et al. | 375/148 |
| 2007/0116099 A1* | 5/2007 | Banister | 375/148 |
| 2007/0121554 A1* | 5/2007 | Luo et al. | 370/335 |
| 2007/0127558 A1* | 6/2007 | Banister | 375/148 |
| 2007/0127588 A1* | 6/2007 | Kim | 375/267 |
| 2007/0195809 A1* | 8/2007 | Blanz et al. | 370/426 |
| 2007/0230611 A1* | 10/2007 | Sorrells et al. | 375/295 |
| 2008/0089223 A1* | 4/2008 | Wu et al. | 370/209 |
| 2008/0112381 A1* | 5/2008 | Shim et al. | 370/342 |
| 2008/0112382 A1* | 5/2008 | Shim et al. | 370/342 |
| 2008/0117959 A1* | 5/2008 | Subrahmanya et al. | 375/224 |
| 2008/0130714 A1* | 6/2008 | Wilborn et al. | 375/144 |

OTHER PUBLICATIONS

Nortel Networks, Wavecom, France Telecom, "Stand Alone DSCH Principles and Benefits". TSG-RAN Working Group 1. Meeting #19. Feb. 27, 2001—Mar. 3, 2001. pp. 1-3, Las Vegas, USA. XP002219118. Retrieved from Internet: www.3gpp.org/flp/lag_ran/WG1_RL1/tsgr1_19/Docs/PDFs/R1-01-0290.pdf.

3GPP, "Feusibility Saidy for OFDM and UTRAN Enhancement (Release 6)". Technical Specifications TR 25.892 v0.2.0. 3GPP TSG RAN. Mar. 2003. Retrieved from the Internet: www.3gpp.ord/ftp/PCG/PCG_10/DOCS/PDF10_19.pdf.

M. Furudatc, et al., "Proposal of Adaptive Downlink Modulation Using OFDM an dMC-CDMA for Future Mobile COmmunications System", Fifth European Wireless Conference (EW 2004)—Mobile and Wireless Systems Beyond 3H. Feb. 24-27, 2004. Barcelona, Spain. Retrieved from Internet: http://research.ac.upc.cs/EW2004/papers/39.pdf.

* cited by examiner

US 7,471,932 B2

SYSTEM AND METHOD FOR EMBEDDING OFDM IN CDMA SYSTEMS

RELATED APPLICATIONS

This application claims the benefits of prior U.S. provisional application No. 60/493,800 filed Aug. 11, 2003 and No. 60/494,087 filed Aug. 12, 2003, hereby incorporated by reference in their entirety.

FIELD OF THE INVENTION

The invention relates to single and multi-carrier CDMA systems and methods, and to methods of providing increased capacity to such systems and methods.

BACKGROUND OF THE INVENTION

Two existing CDMA standards include UMTS, also referred to as WCDMA and 3 GPP, and CDMA 2000 also referred to as 3GPP-2.

Referring firstly to FIG. 1, shown is an example of a conventional WCDMA (wideband code division multiple access) downlink structure. This consists of a number of channels all of which are separated using Walsh codes. These are shown to include a primary SCH (synchronization channel) 10, secondary SCH 12, pilot channel CPICH (common pilot channel) 14 and a dedicated channel 16, for example a voice channel. All of these are typically covered with a high spreading factor, for example 64. There is a 10 ms frame containing 15 slots each 10/15 ms in duration. Also shown is the WDCMA HSDPA (high speed data packet access) channel 18. This channel is used in a time division multiple access fashion, with two millisecond slots being assigned on a scheduled basis to different users. One such 2 ms slot 26 is shown to contain three 10/15 ms slots 20, 22, 24. This provides a fairly high bandwidth channel. This is still transmitted using CDMA, but typically the spreading factor is lower than that used for the other channels, and it might for example be 16 or 32. All of the channels are covered with a common PN code. Advantageously, this structure is backwards compatible with existing UMTS terminals which do note use the WCDMA HSDPA channel. The WCDMA HSDPA is included in the so called EV/DV evolution.

Referring now to FIG. 14, shown as the structure of the conventional CDMA2000 release A/B/C channel structure. This channel structure includes release A\B channels 200 and release-C new channels 202. The release A\B channels 200 include a CDM pilot 204, a synch channel 206, broadcast channel 208, paging and quick paging 210, CACH 214, F-FCH 214, F-SCH 216, F-SPDCCH 218. The release-C new channels 204 include the F-SPDCCH 218 and the F-PDCH 220. The frame structure consists of a 20 ms frame 222 divided into sixteen 1.25 ms slots 228. Each such slot is used to transmit 1536 chips. Eight such slots produce a 12288 chip transmission 230. Some of the channels are power-controlled channels as indicated at 224, and some of the channels are rate-controlled channels as indicated at 226.

For both of the above examples of existing CDMA systems, the Walsh code space available is all but depleted, and as such new methods of providing further bandwidth would be desirable.

SUMMARY OF THE INVENTION

According to one broad aspect, the invention provides a transmitter adapted to transmit a downlink signal comprising: at least one code separated CDMA (code division multiple access) channel(s) that are scrambled with a common scrambling code; an OFDM packet channel overlaid over the CMDA channels, the OFDM packet channel being divided into OFDM slots during which OFDM signals are transmitted with capacity allocated on a per OFDM slot basis, the OFDM packet channel not being scrambled by the common scrambling code.

In some embodiments, the at least one code separated CDMA channel(s) comprises at least one continuous CDMA channels and a CDMA packet channel that is divided into CDMA slots during which CMDA signals are transmitted with capacity allocated on a per CDMA slot basis.

In some embodiments, the at least one code separated CDMA channel(s) comprises a CDMA packet channel that is divided into CDMA slots during which CMDA signals are transmitted with capacity allocated on a per CDMA slot basis.

In some embodiments, the transmitter is adapted to transmit packet data on a sequence of slots, each slot being either an OFDM slot or a CDMA slot, but not both.

In some embodiments, the transmitter is adapted to transmit packet data on a sequence of slots, each slot being an OFDM slot and/or a CDMA slot.

In some embodiments, the transmitter is further adapted to transmit periodically at least one CDMA signalling channel that is not spread by the scrambling code.

In some embodiments, during periods of overlap between the transmission of the at least one signalling channel and the transmission of an OFDM slot, the OFDM slot transmits zeros or known data so that those periods can be treated as a prefix for the OFDM slots upon reception.

In some embodiments, each slot comprises a prefix followed by an IFFT period, followed by a suffix.

In some embodiments, each OFDM slot is 10/15 ms in duration, and the prefix is 128 chips, the IFFT period is 2304 chips, and the suffix is 128 chips.

In some embodiments, the IFFT period comprises a plurality of IFFTs separated by zero insertions.

In some embodiments, the IFFT period comprises 18 128-chip IFFTs.

In some embodiments, the prefix is a designed training sequence.

In some embodiments, the at least one signalling channel is transmitted during the prefix of the OFDM slots, and the OFDM slots transmit zeros during the prefix so that the OFDM channel does not interfere with the at least one signalling channel.

In some embodiments, the transmitter is further adapted to transmit a control channel that identifies to receivers which OFDM slots and/or which CDMA slots are for a given receiver.

In some embodiments, the transmitter is adapted to transmit a control channel during the suffix that identifies to receivers which OFDM slots and/or which CDMA slots are for a given receiver.

In some embodiments, the control channel contains a receiver specific mask and/or a receiver specific CRC code.

In some embodiments, each OFDM slot comprises in sequence: a first prefix; a first IFFT period, a first suffix; a second prefix, a second IFFT period, and a second suffix.

In some embodiments, each OFDM slot is 10/15 ms in duration, and each prefix is 128 chips, each IFFT period comprises 16 64 chip IFFTs, and each suffix is 128 chips.

In some embodiments, a system is provided comprising the transmitter in combination with a plurality of receivers at least one of which is an OFDM-capable receiver, wherein each OFDM-capable receiver demodulates the CDMA channels on an ongoing basis, and each OFDM-capable receiver demodulates a given OFDM slot only if scheduled during the OFDM slot.

In some embodiments, a system is provided comprising the transmitter in combination with a plurality of receivers at least one of which is an OFDM-capable receiver, and each OFDM-capable receiver demodulates a given OFDM slot only if scheduled during the OFDM slot, and each receiver demodulates a given CDMA slot only if scheduled during the CDMA slot.

In some embodiments, the transmitter further comprises a scheduler adapted to schedule receivers on the downlink by: for each of a plurality of OFDM-capable receivers, obtaining a respective channel quality indicator for CDMA slots and/or for OFDM slots; scheduling transmission to OFDM-capable receivers on CDMA and/or OFDM slots according to the channel quality indicators.

In some embodiments, for a given receiver, the channel quality indicator for CDMA slots and/or for OFDM slots comprises a better of the CDMA channel quality indicator and the OFDM channel quality indicator as determined by the receiver.

In some embodiments, the scheduler is further adapted to: for CDMA-only capable receivers, obtain a channel quality indicator for the CDMA slots only, and schedule transmission to CDMA-only capable receivers on the basis of the CDMA channel quality indicator.

In some embodiments, the transmitter is further adapted to: for at least some of the OFDM slots, partition OFDM sub-carriers transmitted during at least some of the OFDM slots between a plurality of receivers on a partitioning period basis.

In some embodiments, a partitioning period comprises one OFDM slot.

In some embodiments, the transmitter is further adapted to transmit a control channel identifying how each OFDM slot is partitioned between receivers such that each receiver can obtain its content.

In some embodiments, the control channel comprises: identifiers for each receiver scheduled during the slot and an indication of which sub-carriers are for which receiver.

In some embodiments, the control channel comprises: a first sub-channel and a second sub-channel; the first sub-channel containing an identifier of a first receiver and an identifier of a last OFDM sub-carrier for the first receiver; the second sub-channel containing an identifier of a second receiver, and an identifier of a last OFDM sub-carrier for the second receiver, the second sub-channel being only transmitted when there is a second receiver scheduled during a given slot.

In some embodiments, the transmitter is further adapted to perform sub-carrier and power allocation.

In some embodiments, the transmitter is adapted to perform sub-carrier and power allocation dynamically as a function of mobility and/or frequency selectivity.

In some embodiments, the transmitter is further adapted to perform sub-carrier and power allocation dynamically as a function of mobility and frequency selectivity by: defining conditions in which CDMA is used instead of OFDM as a function of channel quality and/or mobility and/or frequency selectivity; when conditions indicate OFDM is to be used: a) using a narrow frequency band and high power for high mobility, high frequency selectivity users; b) using a wide frequency band and low power for mid-mobility and mid-frequency selectivity users.

In some embodiments, the transmitter is further adapted to perform OFDM allocation subject to an overall power budget for an OFDM slot.

In some embodiments, the transmitter is adapted for use in a multiple carrier CDMA system.

In some embodiments, the transmitter comprises: an OFDM modulator adapted to generate a single set OFDM sub-carriers that spans the multiple carriers, and in which a single wideband IFFT is performed to do OFDM modulation.

In some embodiments, each carrier is allocated to only one of CDMA or OFDM on a per allocation period basis, and for any carrier that is allocated to CDMA during a given allocation period, zeros are inserted in a portion of the OFDM IFFT that overlaps the carrier during that allocation period.

In some embodiments, the OFDM modulator is adapted to insert guard band sub-carriers between groups of sub-carriers for each carrier.

In some embodiments, each OFDM slot comprises: a control portion which is non-OFDM followed by a plurality of IFFTs each separated by a respective prefix.

In some embodiments, each IFFT is a 128 chip IFFT, and each prefix is 22 zero chips.

In some embodiments, the transmitter is further adapted to: adjust at least one power control parameter prior to transmitting OFDM slots so as to avoid/mitigate power control loop panic.

In some embodiments, the at least one power control parameter comprises an outer loop power control threshold.

In some embodiments, the transmitter is adapted to preferentially transmit CDMA slots in flat fading conditions.

In some embodiments, the transmitter is adapted to preferentially transmit OFDM slots in dispersive conditions.

According to another broad aspect, the invention provides a receiver comprising: an A/D converter adapted to produce a sequence of samples of received signal; CDMA demodulator for performing CDMA demodulation upon the sequence of samples; OFDM demodulator for performing OFDM demodulation upon the sequence of samples.

In some embodiments, the receiver is further adapted to receive a control channel identifying for a given slot whether or not the receiver is scheduled during the slot; wherein the receiver demodulates a given OFDM slot only if scheduled during the slot.

In some embodiments, the receiver is further adapted to: determine a CDMA channel quality indicator for CDMA and an OFDM channel quality indicator for OFDM; feed back a better of the CDMA channel quality indicator and the OFDM channel quality indicator; if the CDMA channel quality is better, use CDMA mode to demodulate a next slot for the receiver; if the OFDM channel quality is better, use OFDM mode to demodulate a next slot for the receiver.

In some embodiments, the receiver is adapted to: perform CDMA demodulation by descrambling at least one common channel, de-spread and perform soft-de-mapping and FEC decoding during which the OFDM content will be substantially converted to AWGN; demodulate the OFDM slots by generating an interference term due to a CDMA component of the received signal, subtract the interference term from the received signal, perform OFDM demodulation on a remaining signal.

In some embodiments, the receiver is adapted to generate the interference term by: de-scrambling, de-spreading, soft de-mapping and FEC decoding (or hard decision), re-encoding, re-spreading, re-scrambling, convolving with an estimated channel response.

In some embodiments, the receiver is adapted to use OFDM pilots to generate channel estimates for both OFDM and CDMA.

In some embodiments, the receiver is adapted to perform channel estimation by: performing an FFT on the sequence of samples; performing a first transformation on a set of samples collectively output by the FFT; performing a per sub-carrier transformation on an output of the first transformation; performing a second transformation on outputs of the per sub-carrier transformations collectively to produce an OFDM channel estimate; and performing an IFFT on the OFDM channel estimate to produce a time domain channel estimate for CDMA finger searching.

In some embodiments, the receiver is adapted to use CDMA pilots for channel estimation for both CDMA and OFDM.

In some embodiments, the receiver is adapted to perform channel estimation by: performing CDMA searching and correlation to produce a time-domain channel response; performing an FFT on the time domain channel response; performing a first transformation on a set of samples collectively output by the FFT; performing a per sub-carrier transformation on an output of the first transformation; performing a second transformation on outputs of the per sub-carrier transformations collectively to produce an OFDM channel estimate; and performing an IFFT on the OFDM channel estimate to produce a time domain channel estimate for CDMA finger searching.

In some embodiments, the receiver is adapted to receive a signal on multiple carriers, the receiver comprising an FFT function adapted to perform an FFT for sub-carriers spanning the multiple carriers.

According to another broad aspect, the invention provides a method comprising: generating at least one code separated CDMA (code division multiple access) channel(s) that are scrambled with a common scrambling code; generating an OFDM packet channel, the OFDM packet channel being divided into OFDM slots during which OFDM signals are transmitted with capacity allocated on a per OFDM slot basis, the OFDM packet channel not being scrambled by the common scrambling code; combining the code separated CDMA channel(s) and the OFDM channel into a combined signal and transmitting the combined signal.

In some embodiments, the at least one code separated CDMA channel(s) comprises at least one continuous CDMA channels and a CDMA packet channel that is divided into CDMA slots during which CMDA signals are transmitted with capacity allocated on a per CDMA slot basis.

In some embodiments, the at least one code separated CDMA channel(s) comprises a CDMA packet channel that is divided into CDMA slots during which CMDA signals are transmitted with capacity allocated on a per CDMA slot basis.

In some embodiments, the method further comprises for at least some of the OFDM slots, partitioning OFDM sub-carriers transmitted during at least some of the OFDM slots between a plurality of receivers on a partitioning period basis.

In some embodiments, the method further comprises performing sub-carrier and power allocation dynamically as a function of mobility and/or frequency selectivity.

In some embodiments, the method is adapted for use in a multiple carrier CDMA system, the method further comprising generating a single set OFDM sub-carriers that spans the multiple carriers, and in which a single wideband IFFT is performed to do OFDM modulation.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
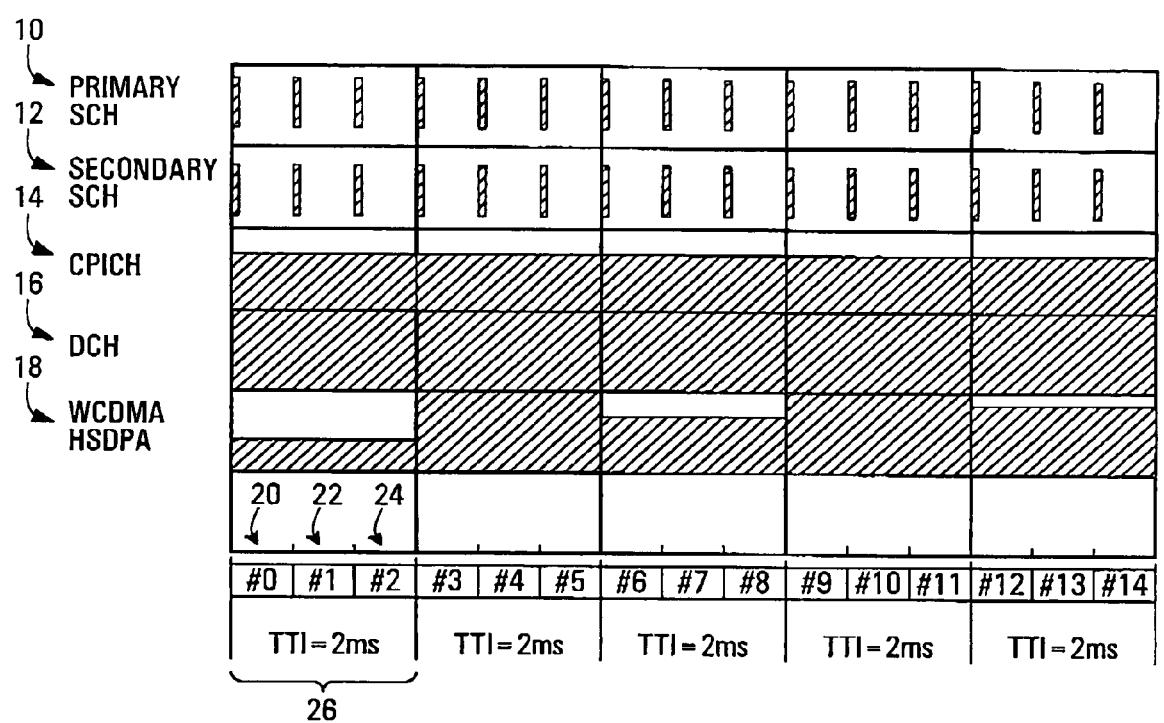
FIG. 1 shows the conventional WCDMA downlink structure.
Figure 2:
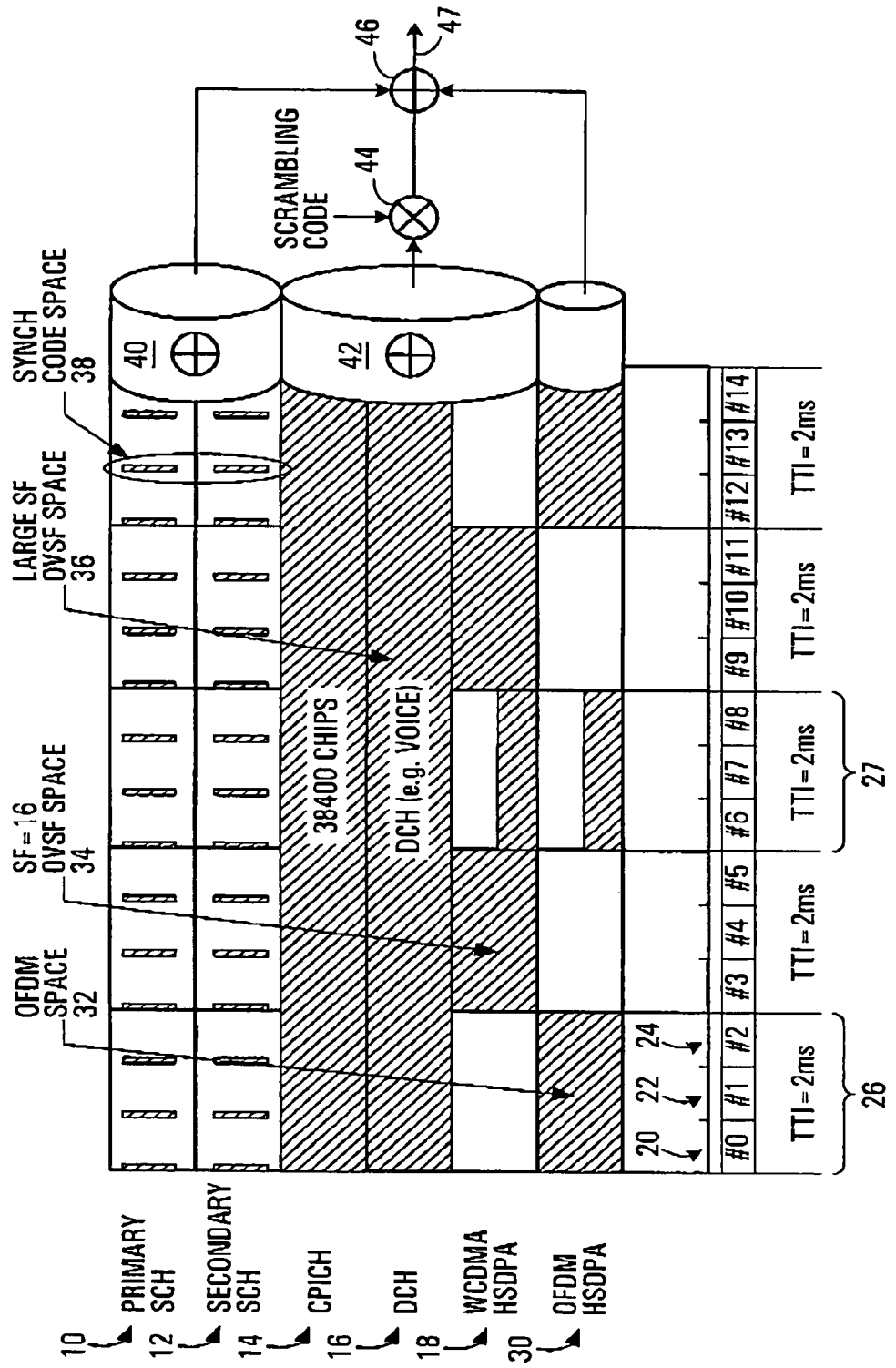
FIG. 2 shows a new downlink structure provided by an embodiment of the invention featuring an OFDM channel.

Referring now to FIG. 2, shown is a downlink structure provided by an embodiment of the invention. Shown are the same channels discussed previously with reference to FIG. 1. In addition, there is an extra OFDM (orthogonal frequency division multiplexing) HSDPA channel 30. This channel is overlaid on top of the other channels using the same time slot structure that is used to allocate the WCDMA HSDPA 18. In the illustrated example, this consists of two millisecond time slots. These time slots are allocated using scheduling. A detailed example of a method of user scheduling is provided below. This results in a downlink slot structure having an OFDM space 32, a spreading factor equal 16 OVSF (orthogonal variable spreading factor) space 34, a large spreading factor OVSF space 36, and a synchronization code space 38 (more generally a signalling code space over which signalling channels can be transmitted that may or may not be for synchronization purposes). The synchronization channels are typically spread by a system-wide spreading code, and are combined at 40; the large spreading factor OVSF signals 36 and the spreading factor equals 16 OVSF signals 34 are combined at 42 and scrambled by a common scrambling code at 44. Then, the combined CDMA signal produced as a result of the common scrambling code 44 and the combined synchronization channels are combined at 46 with the OFDM HSDPA channel 30 to produce the overall time domain output signal 47. In one embodiment, in a given slot only OFDM HSDPA 18 or WCDMA HSDPA 30 is transmitted, as shown in the first two millisecond slot 26 of the example shown in FIG. 2 in which case the slot is an OFDM slot or a CDMA slot respectively. In another embodiment, for some slots a WCDMA HSDPA signal and a OFDM HSDPA signal are allowed to be transmitted simultaneously during a given slot, for example is shown in the third two millisecond slot 27 of the example of FIG. 2. Here one slot contains both an OFDM slot and a CDMA slot. These might be transmitter with lower power when both are present. In yet another embodiment, the WCDMA-HSDPA 18 is removed entirely. The interference caused by the CFDM HSDPA 30 and seen by the other CDMA channels 10, 12, 14, 16 may be less than that caused by the low spreading factor WCDMA HSDPA 18.

As indicated above, the existing channels are scrambled using a common scrambling code. However, the OFDM HSDPA channel is not scrambled by the scrambling code.

It is noted that the data rate for the OFDM slots in some embodiments is about two times the data rate which would be possible on the WCDMA HSDPA slot.

It is noted that for WCDMA, the interference between the WCDMA HSDPA channel and the other CDMA channels, for example the pilot channel and the dedicated channel are well understood. Advantageously, the fact that all of these channels are covered with a common PN code makes these channels appear as noise to the OFDM slot. Furthermore, the fact that a high spreading factor is used for these channels, for example 64, means that there is a high processing gain and the OFDM slots appear as noise far below that of these channels taking into account the processing gain. For a 64 spreading factor, there is a 18 dB processing gain. For this reason, the transmission of the OFDM slots is substantially transparent to the existing CDMA transmissions.

Advantageously, this scheme is backwards compatible with existing UMTS systems, and is also backwards compatible with existing WCDMA systems. New implementations will simply need to include the one additional mode, namely the OFDM mode which allows the transmission of OFDM slots overlaid over the existing transmissions. In some embodiments, the mode is dynamic as a function of time, and the slots during which OFDM is used as opposed to WCDMA on the HSDPA are determined on an ongoing basis by scheduling.

Figure 3:
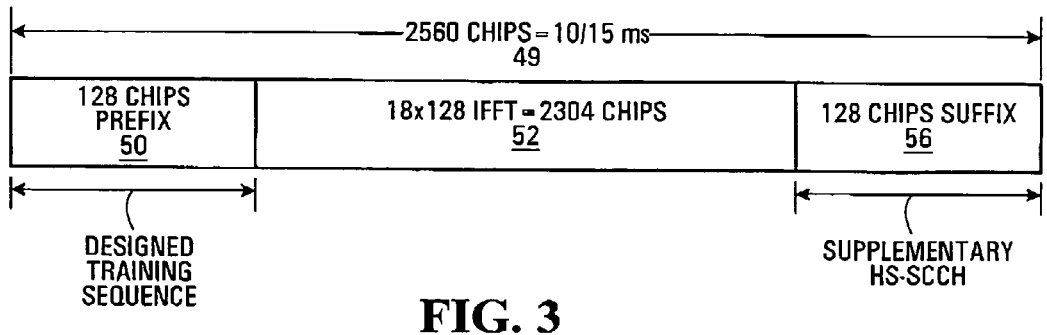
FIG. 3 is a slot structure for the OFDM channel of FIG. 2, as provided by an embodiment of the invention.

Referring now to FIG. 3, shown is a first example of an OFDM slot structure that can be employed with the DL structure discussed with reference to FIG. 2. This slot structure has 2560 chips 49 for a 10/15 ms slot which is identical to the number of chips per 10/15 ms slot in the CDMA signal. Because of this, the summer 46 performs a single chip-by-chip summing of the scrambled CDMA component and the OFDM slot structure of FIG. 3. Advantageously, by tying together the slot structure for the CDMA and CFDM components, some of the functions performed from CDMA such as synchronization and channel estimation, can be re-used directly from the OFDM component. In the illustrated example, the data period 52 contains 18 IFFTs, each 128 chips in length, arranged sequentially in time. With this structure, there is a 128 chip prefix 50 which contains a designed training sequence, followed by a 2304 chip data period 52, which is followed by a 128 chip suffix 56. The OFDM prefix contains known or highly reliable data and is provided to enhance the channel estimation both for the OFDM capable mobile terminal and for the legacy mobile. Preferably, a small size IFFT is employed to support high speed mobility.

The example of FIG. 3 is a very specific slot structure that mounts nicely to the 2560 chip legacy slot structure. In a particular example, there is a prefix, a suffix and there is a data segment with 18 IFFTs. More generally, the number of IFFTs, the size of each IFFT and the presence or absence of a prefix or suffix, and the size and content of the prefix and suffix, are all design parameters of a particular implementation. Several detailed examples are provided herein, but it is not the intent to limit the invention to these examples.

Figure 4:
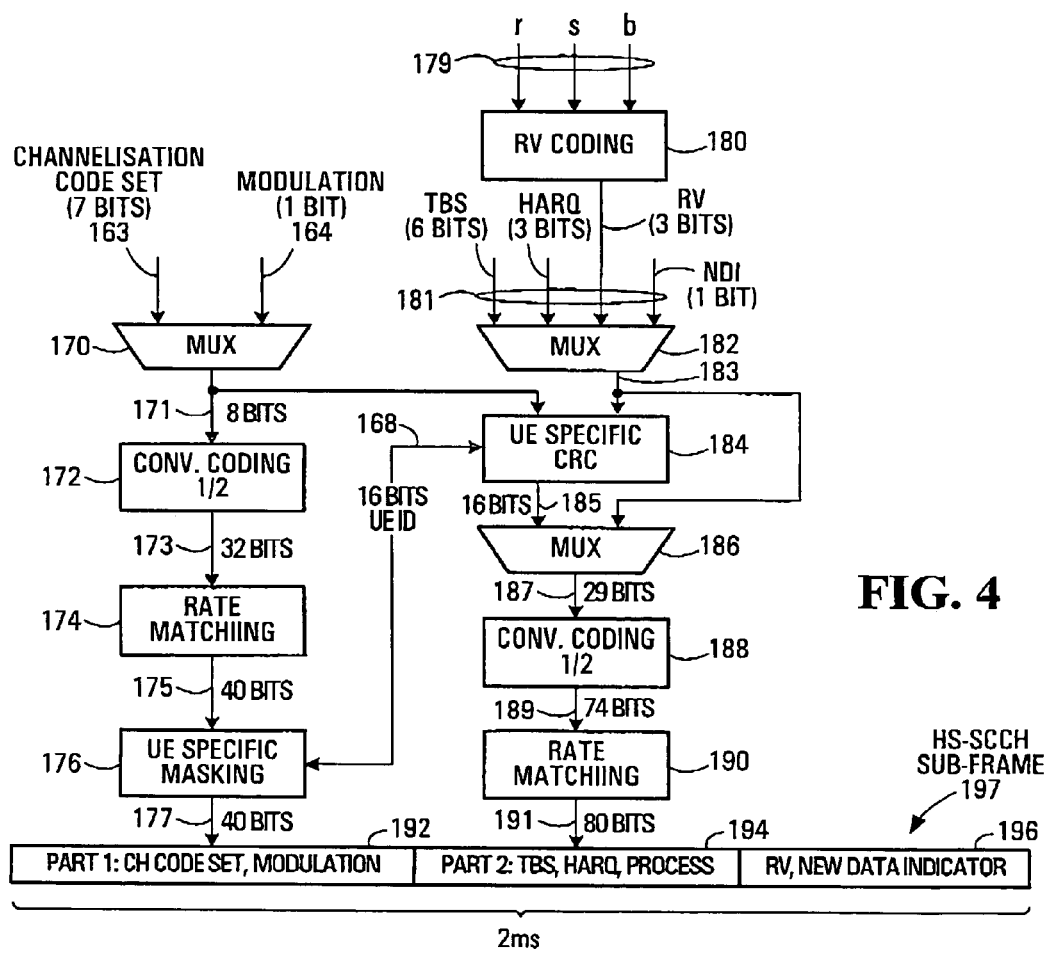
FIG. 4 is a flow chart showing a method of coding of the HS-SCCH information, as provided by an embodiment of the invention.

In some embodiments, the suffix is used to transmit a supplementary HS-SCCH (High Speed Shared Control Channel). An example method of coding of the supplementary HS-SCCH is shown in FIG. 4, this also showing example data transmitted on this channel. In this example, the supplementary HS-SCCH is used to transmit information that allows receivers to determine where their content has been transmitted in the downlink structure. This example provides a very specific method of transmitting channelization code set 163, modulation 164, R, S, B information 179, TSB, HARQ, NDI (new data indicator) and RV information 181, and user equipment identifiers 165 using the suffix portion of the slot structure of FIG. 3. It is to be understood that these particular types of control information may not all be required for a given implementation, and the number of bits for each parameter may be different for a given implementation. Furthermore, while it is preferred this information is transmitted in the suffix of the OFDM slot structure of FIG. 3, more generally, it can be transmitted on any appropriate control channel. In the illustrated example, the channelization code set 163 and modulation 164 are multiplexed with multiplexer 170 to produce eight bits 171 that are input to a one-half rate convolutional coding step 172. This produces seventy-two bits 173 that are input to the rate matching function 174. The rate matching function 174 produces forty bits 175 that are input to a UE-specific masking function 176. This function takes the sixteen bit UE identifier 165 and performs a masking of the output of the rate matching function 174 to produce a forty bit output 177.

The R, S and B outputs 179 are input to an RV coding function 118. Three bits output by the RV coding function 180, together with a six bit TBS, a three bit HARQ and an NDI bit, collectively indicated at 181, are input to a multiplexer 182 which produces a thirteen bit output 183. The eight bit output by multiplexer 170 and the thirteen bits output by multiplexer 182 are input to a UE specific CRC function 184. The UE specific CRC is calculated over the combination of the eight bits 171 and the thirteen bits 183, and produces a sixteen bit CRC output 185. This is multiplexed with the thirteen bits 183 in multiplexer 186 to produce a twenty-nine bit output 187. This output is subject to convolutional coding at rate one-half as indicated at 188. This produces at seventy-four bit output 189 which is input to a rate-matching function 190 which then produces an eighty bit output 191.

The output 177 contains the channelization code set and modulation information. The eighty bits output at 191 contain the TBS, HARQ process, RV information, and the new data indicator. The output 191 also contains the UE specific CRC calculated for all of the information, namely the channelization code set, the modulation, the TBS, the HARQ, the RV, and the NDI.

The overall output contains information for three slots 192, 194, 196. The slot structure of FIG. 3 is repeated three times to transmit one HS-SCCH sub-frame 197. The first third of the sub-frame 192 is transmitted during the first slot. The second portion 194 of the sub-frame is transmitted during the second. The third portion 196 of the sub-frame is transmitted during the third slot. The sub-frame structure then repeats itself. It can be seen that forty bits are transmitted during each 128 chip suffix.

The sixteen bit UE identifier identifies which receiver is to receive the current HSDPA content.

Figure 5:
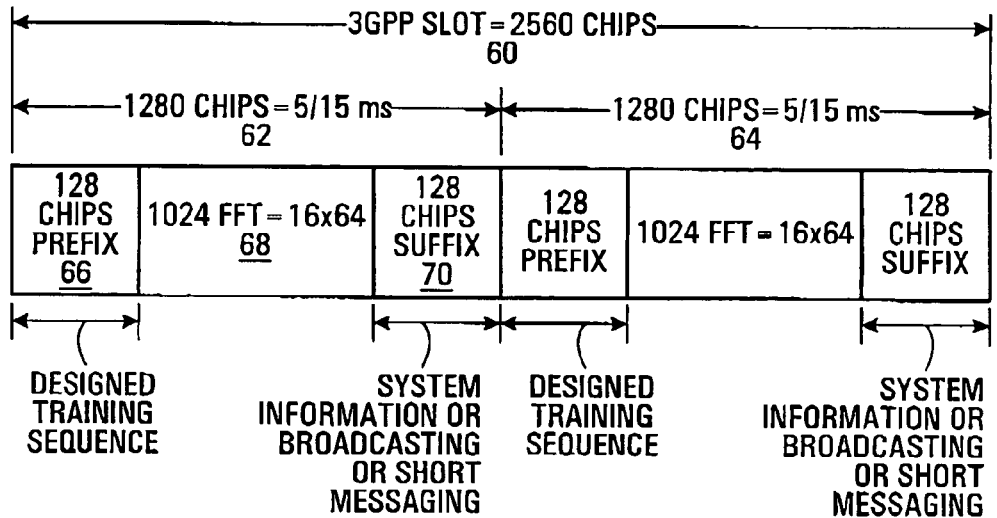
FIG. 5 is another example of an OFDM slot structure provided by an embodiment of the invention.
Figure 10:
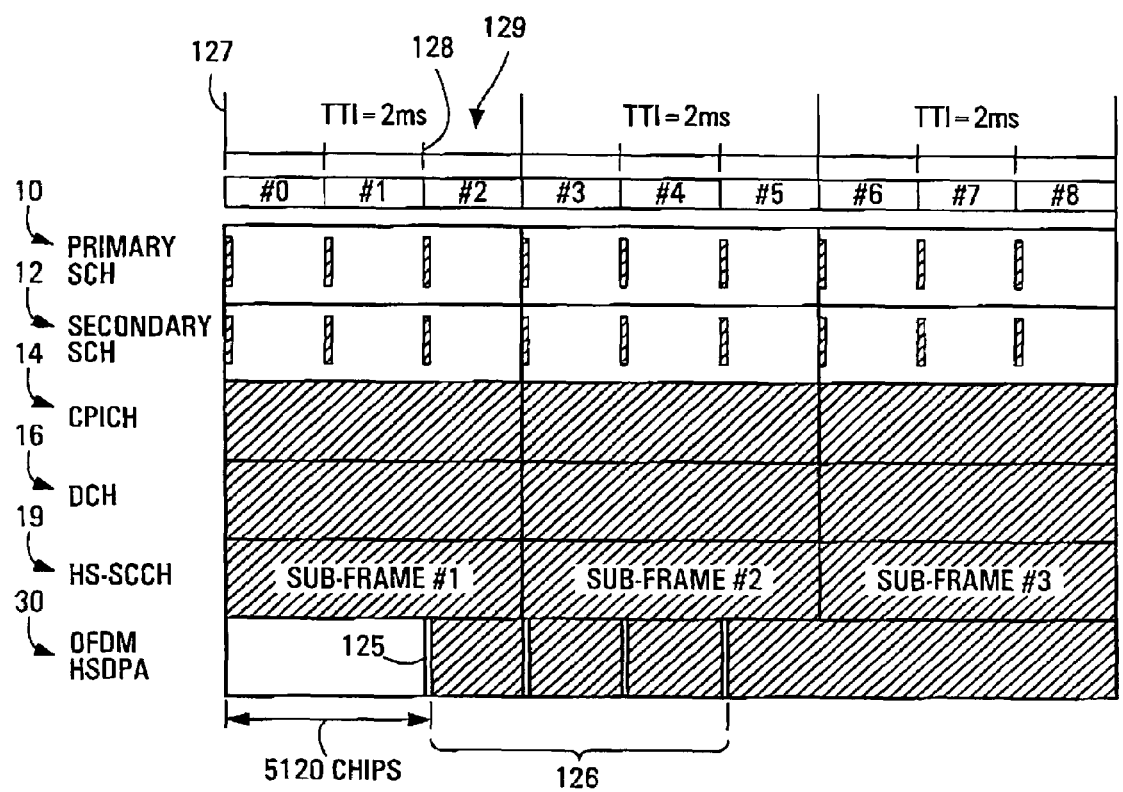
FIG. 10 illustrates prefix insertion and removal in accordance with an embodiment of the invention.

In another embodiment, the OFDM slot structure shown in FIG. 5 is employed. With this structure, there is a 128 chip prefix 66 followed by 1024 chip data portion 68 followed by a 128 chip suffix 70 which combine to produce a 1280 chip, 5/15 ms sub-slot 62. In this case, the data portion 68 consists of sixteen 64 chip FFTs transmitted in sequence. This is then repeated with a separate sub-slot 64 to generate an overall 2560 chip slot 60. The suffixes may for example be used to send system information or to broadcast or to send short messages. The prefixes in this embodiment are again used to transmit designed training sequences which can be employed for channel estimation. In some embodiments, slots are 0.67 ms in duration, but are allocated (scheduled) in groups of three, or 2 ms periods, also referred to as TTIs (transmit time intervals), this being 3GPP terminology. In some embodiments, the groups of three slots do not need to be aligned with the TTIs in the remainder of the transmission. An example of this is shown in FIG. 10 where the start of the three slots for the OFDM is two slots delayed from the start of the TTI. However, the timing of the OFDM slots is still tied to the timing of the CDMA signals.

Figure 6:
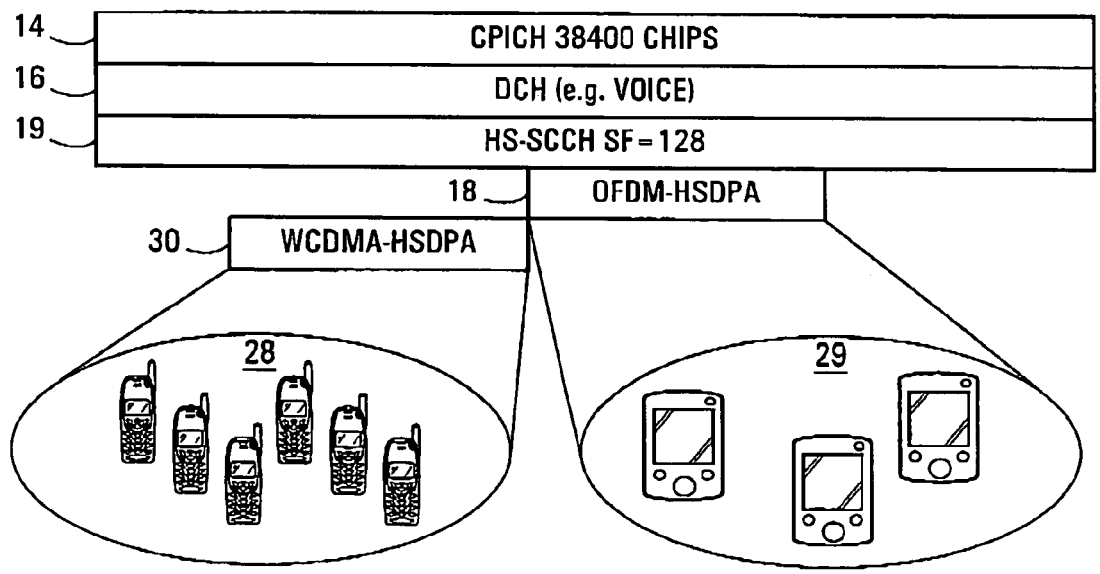
FIG. 6 is an illustration of the downlink structure of FIG. 2 in operation.

Preferably the HS-SCCH is used to indicate to a given user whether or not it is scheduled to receive OFDM data during a given slot. FIG. 6 shows an example of how the downlink operation can proceed. Conventional users indicated generally at 28 will already demodulate the HS-SCCH 19. Every WCDMA user 16 equipment 28 demodulates the common channels 14, HS-SCCH 19 and the DCH 30 all the time. Then, the WCDMA UE 28 demodulates the WCDMA HSDPA 30 channel if it is scheduled. The supplementary HS-SCCH described above with reference to FIGS. 4 and 5 is another control channel which is available for transmitting to users. In some embodiments this is transmitted using CDMA technology, but during the suffix of the OFDM time slot. In some embodiments, the existing HS-SCCH is used to tell a user whether or not to look at the supplementary HS-SCCH.

Each OFDM/WCDMA UE generally indicated at 29 demodulates the common channels 14, the HS-SCCH 19 and DCH 16 all the time. The OFDM/WCDMA UE 29 demodulates OFDM HSDPA channel 18 only if it is scheduled. Preferably, during the prefix period and/or the suffix period, nothing is transmitted on the OFDM channel 30. When this is done, the receiver can clearly see the remaining channels and in particular can see the CPICH if transmitted during these periods. Then, the CPICH that is transmitted by the conventional CDMA transmitter can be received and treated as a prefix for the purpose of the OFDM channel reception. To achieve this, zeros are placed there for the OFDM transmission. Alternatively, something else that can be accurately demodulated could be placed there such as a pre-defined training sequence and/or a classical OFDM cyclic pre-fix.

Another embodiment of the invention provides a method of scheduling the down link introduced above.

Figure 7:
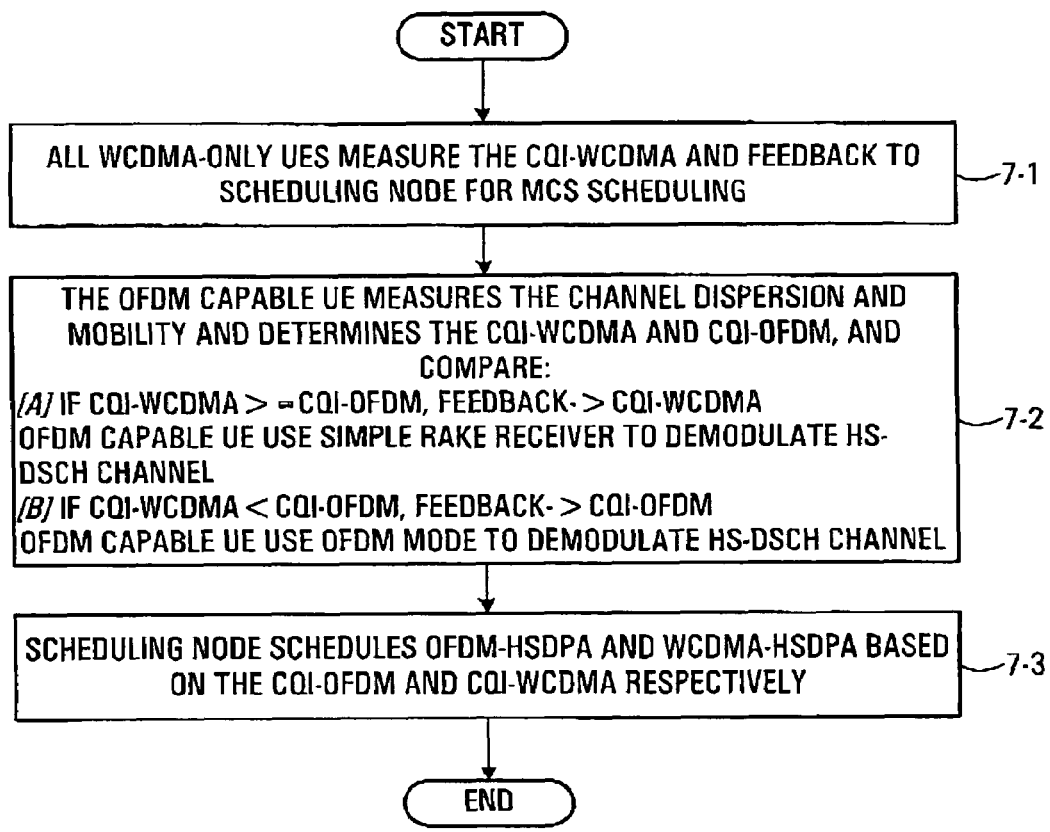
FIG. 7 is a flow chart of an example method of scheduling OFDM and WCDMA users on the downlink.

FIG. 7 shows an example of the scheduling method. In step 7-1, all WCDMA-only UEs measure a channel quality indicator in respect of WCDMA and feed these back to a node responsible for scheduling, hereafter referred to as a scheduler, for MCS scheduling.

In step 7-2, the OFDM capable user equipment (UE) measures the channel dispersion and mobility and determines a channel quality indicator for each of WCDMA and OFDM and performs a comparison. More particularly, a comparison is made between the channel quality indicator for WCDMA, referred to as $CQI_{WCDMA}$ and the channel quality indicator for OFDM, referred to as $CQI_{OFDM}$ is made. If $CQI_{WCDMA}$ is greater than or equal to $CQI_{OFDM}$, then only the $CQI_{WCDMA}$ is fed back to the scheduler. In this case, the OFDM capable UE uses a simple rake receiver to modulate the HSDPA channel. On the other hand, if $CQI_{WCDMA}$ is less than $CQI_{OFDM}$ then only $CQI_{OFDM}$ is fed back, and the OFDM capable UE uses OFDM mode to demodulate the HSDPA channel. Then, at step 7-3, the scheduling node schedules OFDM-HSDPA and WCDMA-HSDPA users based on these two quality measurements respectively.

Assuming proper power allocation the OVSF code can be guaranteed to co-exist with OFDM. To demodulate the common channels and the dedicated channel the steps of de-scrambling, de-spreading, and soft de-mapping and FEC decoding are performed. After the step of de-spreading, the OFDM signal portion will be converted into AWGN. In other words the fast Hadamard transform of an IFFT can be approximated by additive white Gaussian noise. An example of a very specific co-exist condition is as follows:

$$P_{DCH} + 10\log_{10} SF_{DCH} - P_{OFDM} - P_{COMMON} > DECODE_{target}(dB)$$

The above equation, $P_{DCH}$ is the power of the DCH channel, $SF_{DCH}$ is a spreading factor of that channel, $P_{OFDM}$ is the power of the OFDM channel, $P_{COMMON}$ is the power of the common channels, and $DECODE_{target}$ is a minimum SNR requirement for a common channel (say voice) or a dedicated channel. This ensures backward compatibility with legacy UE.

CDMA Reception

Advantageously, in some embodiments changes may not be required to the CDMA RAKE receiver.

In some embodiments, interference cancellation is performed prior to demodulating the OFDM slots so as to remove the effects of the CDMA signal. This can be done by performing conventional rake reception on the CDMA signal to generate a channel estimate. The common channel, voice channel, etc are de-spread, for example using a fast Hadamard transform (FHT) then, hard decision detection is performed for all of these channels, and the channels are then re-generated using the hard decisions convolved with the time domain channel response. This then gives a time domain representation of the interference due to these channels. This time domain representation is then subtracted from the input to remove the CDMA interference from the OFDM portion.

Advantageously, much of this processing will already have been done in conventional, CDMA receivers, and as such this can be reused.

Once the interference due to the CDMA portion has been subtracted, the OFDM slots can be demodulated, and any OFDM demodulation approach can be used. Preferably the conventional OFDM demodulation approaches are employed. It is noted that the OFDM slots are sent in the same frequency band and at the same time as existing CDMA transmissions.

Figure 8:
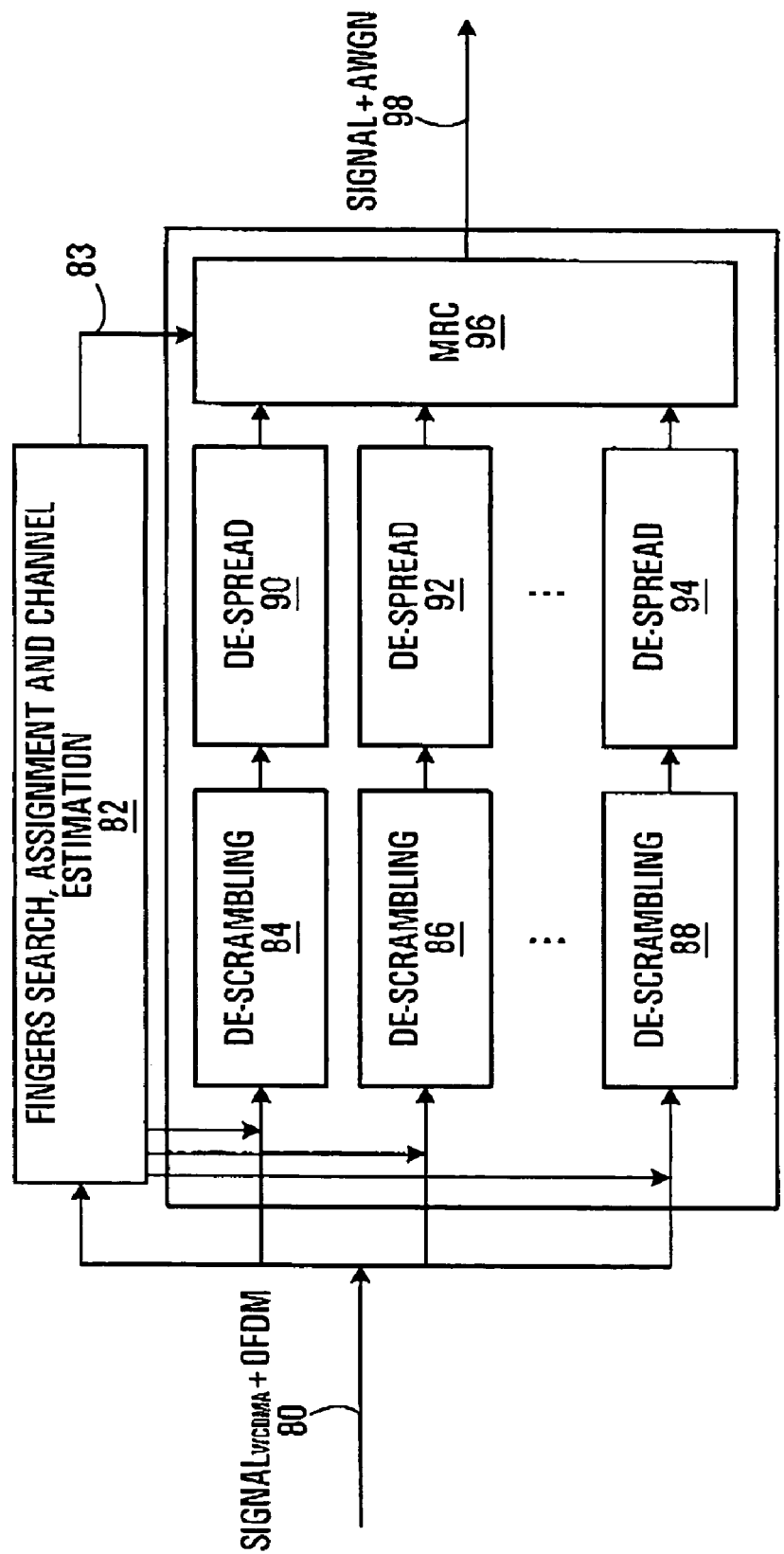
FIG. 8 is a block diagram of WCDMA mode reception in the presence of OFDM-HSDPA.

FIG. 8 is a block diagram of WCDMA mode reception of a signal 80 containing the WCDMA content in the presence of OFDM-HSDPA. Preferably, completely conventional WCDMA reception is performed. This involves performing finger searching, assignment and channel estimation 22 in a conventional way for CDMA. The output of this is used to de-scramble and de-spread 90, 92, 94 all of the multi-path components (only three shown) and the output of this process is fed into an MRC (maximum ratio combining) process 96 which produces an output 98 consisting of the received signal plus additive white Gaussian noise due to the OFDM component.

Figure 9:
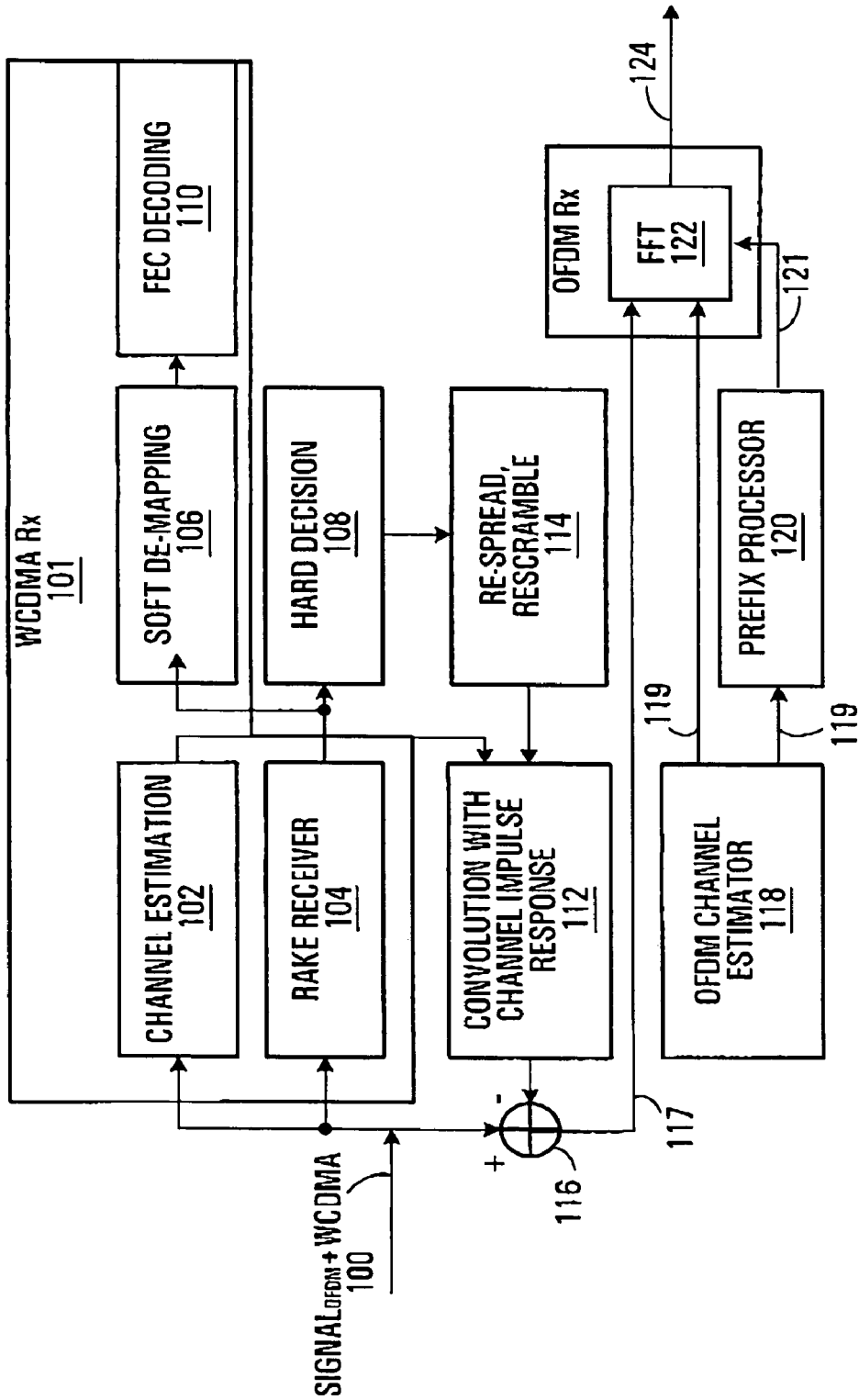
FIG. 9 is a block diagram of OFDM-HSDPA mode reception in the presence of WCDMA.

FIG. 9 is a block diagram of a example receiver for the OFSM-HSDPA reception. A received signal 100 has a desired OFDM component and a WCDMA component which is interference. It can be seen that parts of this receiver form a standard WCDMA receiver 101, and this block contains the channel estimation 102, rake receiver 104, soft de-mapping 106 and FEC decoding functions 110.

The output of the rake receiver 104 is also passed to a hard decision block 108 which generates hard decisions upon the output of the rake receiver 104. These outputs are re-spread and re-scrambled 14 and finally convolved with the channel impulse response 112 to get a good time domain estimate of the contribution to the received signal 100 due to the WCDMA component. This signal is then subtracted with subtractor 116 from the received signal 100 to produce a signal 117 which is substantially only the OFDM component. This is fed through an OFDM channel estimator 118 which produces an OFDM channel estimate 119, and prefix processor 120 which produces a prefix processor output 121. The OFDM signal 117, the channel estimate 119 and the prefix processor output 121 are all fed into the FFT block 122 and OFDM reception is then conducted to produce overall output 124.

Preferably, the prefix processor is an optional component as defined in applicants co-pending application Ser. No. 10/662,465 filed Sep. 3, 2003, hereby incorporated by reference in its entirety.

FIG. 10 shows an example of slot alignment for the OFDM HSDPA with the remainder of the transmission. Here, the start 125 of the OFDM sub-frame 126 (one TTI in duration) is aligned with the start 128 of the third slot (slot #2) 29 in the regular TTI 127. Other alignments are possible so long as there is a known relationship in the timing. Preferably, the "0" insertion is performed as discussed previously such that the pilot channel has no OFDM interference.

Figure 11:
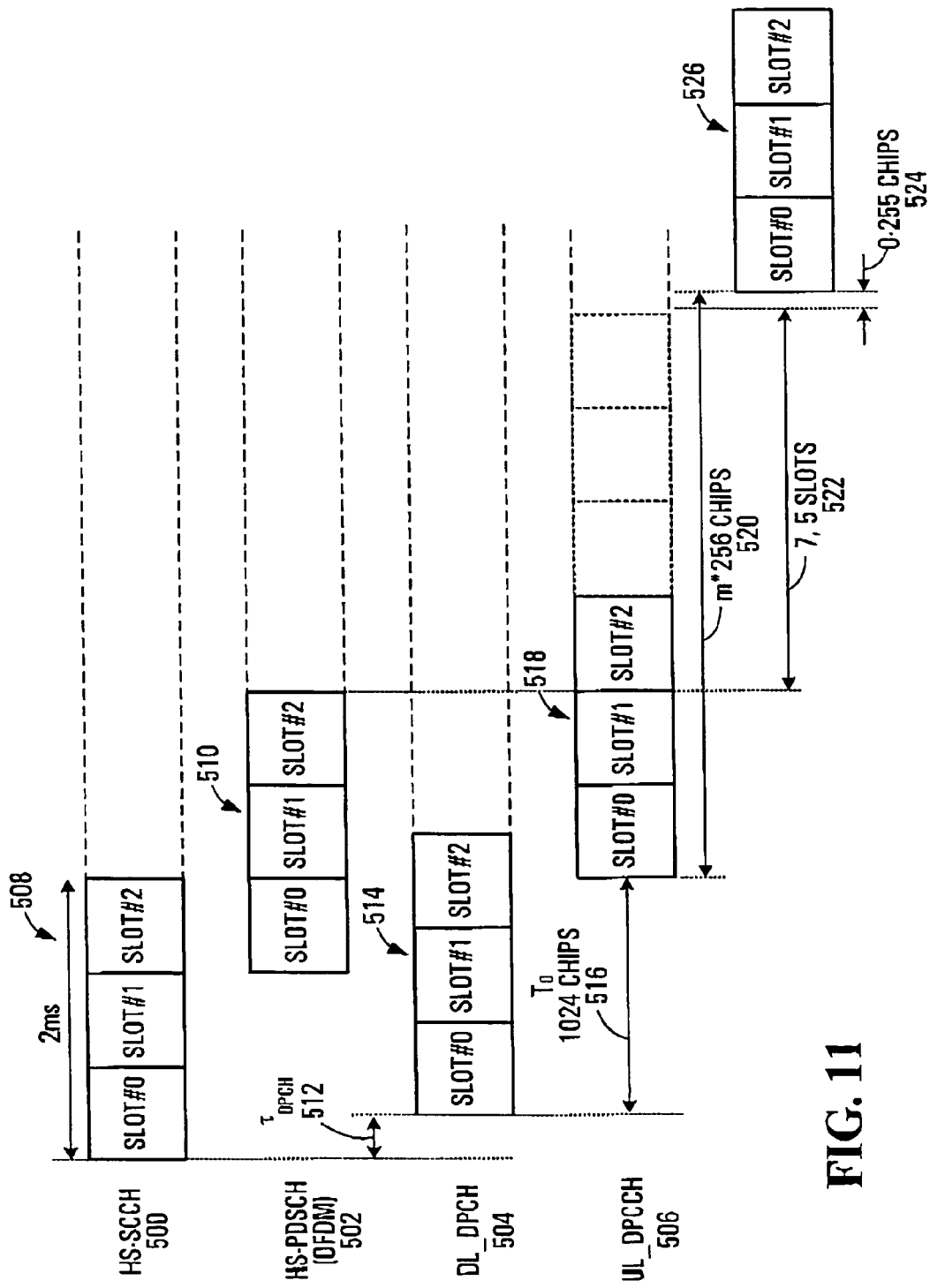
FIG. 11 shows an example of OFDM mode transmission and scheduling.

FIG. 11 provides an example of OFDM mode transmission and scheduling. Four channels are shown schematically, namely the HS-SCCH 500, the HS-PDSCH (high speed packet downlink signalling channel) 502, the DL_DPCH (downlink packet channel) 504, and the UL_DPCCH (uplink dedicated packet control channel). The HS-SCCH is used to transmit control information in a 2 ms sub-frame. One such sub-frame is illustrated at 508. The HS-PDSCH 502 is transmitted slotwise as shown by way of example at 510. The DL_DPCH 504 is transmitted slotwise as shown by way of example at 514. Finally, the UL_DPCCH 506 is transmitted slotwise as shown by way of example at 518. The scheduling process begins with the UE receiving control information on the HS-SCCH. Then, the UE receives a transport block on one or several HS-PDSCH. Next, the UE positions the HS-DPCCH with respect to the HS-PDSCH. In an example implementation, the HS-DPCCH is positioned m×256 chips after the UL_DPCCH with m such that ACK\NACK starts within 0 to 255 chips after 7.5 slots following the reception of the HS-PDCH sub-frame. Thus, in this example the positioning of the HS-DPCCH is tied to both the UL_DPCCH and the HS-PDSCH.

Figure 12:
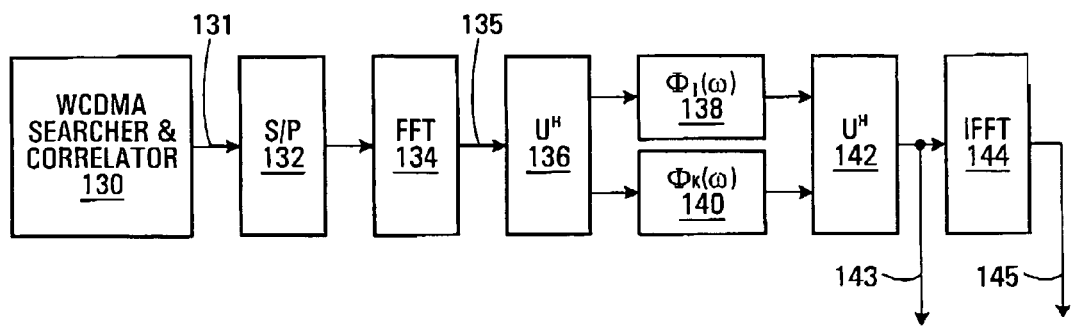
FIG. 12 is a block diagram of OFDM channel estimation in accordance with an embodiment of the invention.

FIG. 12 shows an example of how OFDM channel estimation can be employed which is based on the WCDMA pilot. WCDMA searching and correlation is performed 13 to generate a time domain channel response 131 which is then padded with zeros, and converted to frequency domain channel response 135 with an FFT function 134, converted to parallel form with serial to parallel converter (S/P) 132. The frequency domain channel response 135 is then filtered collectively, with filter UH 136 and then each sub-carrier channel response is filtered with a respective filter. Only the filters 132, 140 from sub-carriers "1" and "K" are shown. These are filtered again with filter UH 142 to provide a new improved frequency domain channel response 143. This is then used for OFDM demodulation. Passing this improved frequency domain channel response through an IFFT function 144 results in an improved time domain channel response 145 which can be used for WCDMA demodulation.

The filters UH and pi are constructed to filter out the time profiles of the impulse channel response. For example, the real world channel response may only span L samples, so after L samples the remaining samples are set to zero to reduce the noise.

Figure 13:
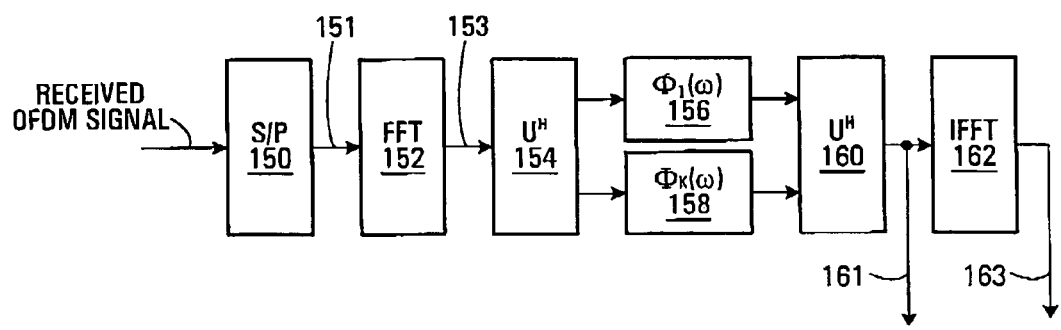
FIG. 13 is a block diagram of WCDMA channel estimation.

FIG. 13 shows an example of how WCDMA channel estimation can be employed which is based on OFDM pilots. The OFDM symbols can be used to transmit pilot subcarriers, for example in a scattered fashion. This process begins by converting a serial stream of samples to parallel form with S/P function 150, this being a "received FFT signal" 151. The received FFT signal 151 is converted to a time domain signal 153 with an FFT function 152. Then, the pilots are extracted, and the remainder of the process is concerned with extracting the channel using the pilots. In other words, preferably only the OFDM pilots are used for channel estimation. This involves filtered the pilot channel estimates collectively, with filter UH 154 and then filtering each sub-carrier channel response individually with a respective filter, two such filters 156, 158 being shown in the illustrated example. These are then filtered again with filter UH 160 to provide a new improved frequency domain channel response 161. This is then used for OFDM demodulation. Passing this improved frequency domain channel response through an IFFT function 162 results in a time domain channel response 163 which can be used for WCDMA channel and finger searching.

Hybrid Mode Assignment

Various mechanisms can be used to assign modes of operation in systems in which both the OFDM-HSDPA and the WCDMA-HSDPA are available. Preferably, the common channel and DCH are set up and operation as per release 5, a UMTS standard release for HSPDA. Preferably, the HSDPA channel (referring to both the OFDM and WCDMA components) is scheduled by a scheduler in a base station. The OFDM-HSDPA and WCDMA-HSDPA is a dynamic parameter meaning the sequence of transmission of the OFDM-HSDPA and/or the WCDMA-HSPDA can be changed dynamically. The OFDM mode is preferably flagged in the HS-SCCH channel. In a preferred embodiment, there is a TDM (Time Division Multiplexing) arrangement of OFDM-HSDPA and WCDMA-HSDPA modes. However, as described previously, these two modes can co-exist preferably with a reduction in the power used for each of the modes. The HARQ (Hybrid Automatic Repeat Request) re-transmission mode follows the first transmission.

Voice and CBR-LDD conversational services are preferably mapped onto the release 4 DCH channels for both WCDMA UE's and OFDM UE's. Background data download and streaming services are preferably mapped onto the HSDPA service.

It is noted that the OFDM transmissions can be mapped onto a MIMO (Multiple Input Multiple Output) configuration. In such an embodiment, preferably MIMO pilots are embedded within the OFDM transmissions. The WCDMA channels are still mapped onto non-MIMO channels. This supports OFDM transmit diversity and supports OFDM TxAA.

An example set of parameters that summarizes the two specific OFDM slot structures described above with respect to FIGS. 3 and 5 is provided in table 1 below. It is to be clearly understood that this is simply one example of an OFDM slot structure. The TTI duration may be different and may contain a different number of slots. The FFT size may be different, and may contain a different number of smaller FFTs or be simply a single large FFT. The sampling rate may be different from that described. However, preferably the sampling rate is identical to that used in the underlying CDMA system. The ratio of the OFDM sampling to the UMTS chip rate is preferably the UMTS oversampling rate. The guard time of 256 chips is but one example. Preferably, the guard time is a time span larger than the multi-path delay spread. The sub-carrier separation is a function of the amount of bandwidth to be employed and the number of sub-carriers used. The number of OFDM symbols per TTI is 18 for the FIG. 3 embodiment, each symbol being a 128 point FFT, and is 16 for the FIG. 5 embodiment, each symbol being a 64 point FFT. Other numbers may alternatively be employed. The OFDM slot duration of the two configurations maps nicely upon the slot structure of the underlying CDMA systems. Preferably the slot structure is tied to the CDMA timing so that the CDMA timing can be used for the OFDM slots as well. The OFDM bandwidth is preferably similar to that used for the CDMA system. In a multi-carrier system, this OFDM bandwidth can increase. For the particular set of features/parameters given, the peak channel rates in the table are the result. However, these are clearly subject to the selection of all the other parameters. For the two examples, the total system overhead (guard interval etc.) is less than ten percent.

TABLE 1

| Parameters | Config. A | Config. B |
|---|---|---|
| TTI duration | 2 ms or 3 slots | 2 ms or 3 slots |
| FFT size | 2304 or 18 × 128 FFT | 1024 or 16 × 64 |
| Sampling rate | 2 × 3.84 Msps or exactly same as UMTS | 2 × 3.84 Msps or exactly same as UMTS |
| Ratio of OFDM sampling to UMTS chip rate | UMTS over sampling rate | UMTS over sampling rate |
| Guard time | 256 chips = 66.66 μs | 256 chips = 66.66 μs |
| Sub-carrier Separation | 1.66666 kHz | 3.75 kHz |
| # of OFDM symbols per TTI | 1 | 2 |
| OFDM symbol duration | 0.667 ms | 0.3333 ms |
| # of useful sub-carriers | 2048 or TBD | 940 or TBD |
| OFDM bandwidth | 3.84 MHz | 3.84 MHz |
| Peak channel rate with QAM16 | 2 × 12.288 Mbps - coding overhead | 2 × 11.28 Mbps |
| Total system overhead | <10% | <10% |

Figure 14:
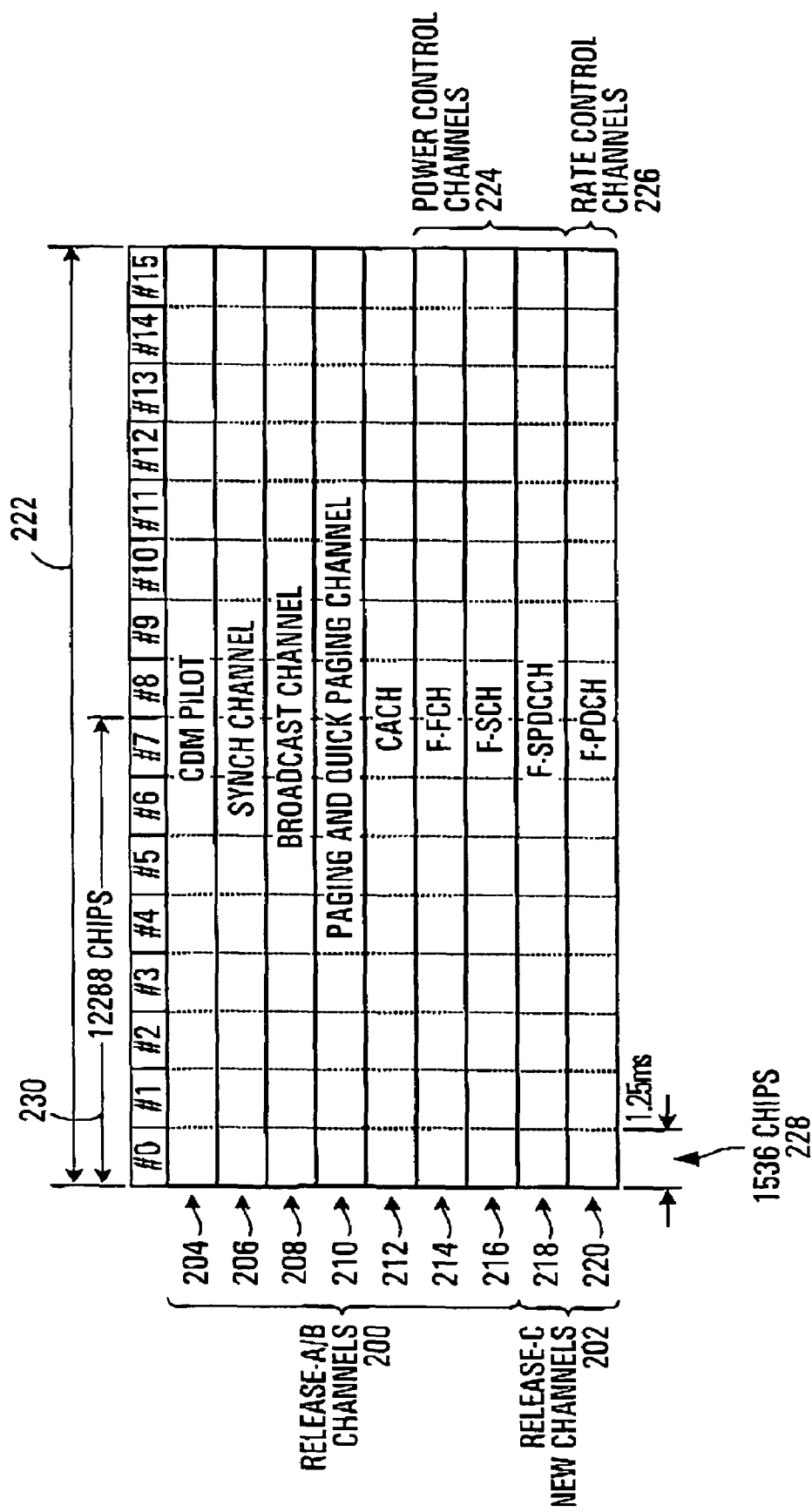
FIG. 14 shows the conventional CDMA2000 release A\B\C channel structure.
Figure 15:
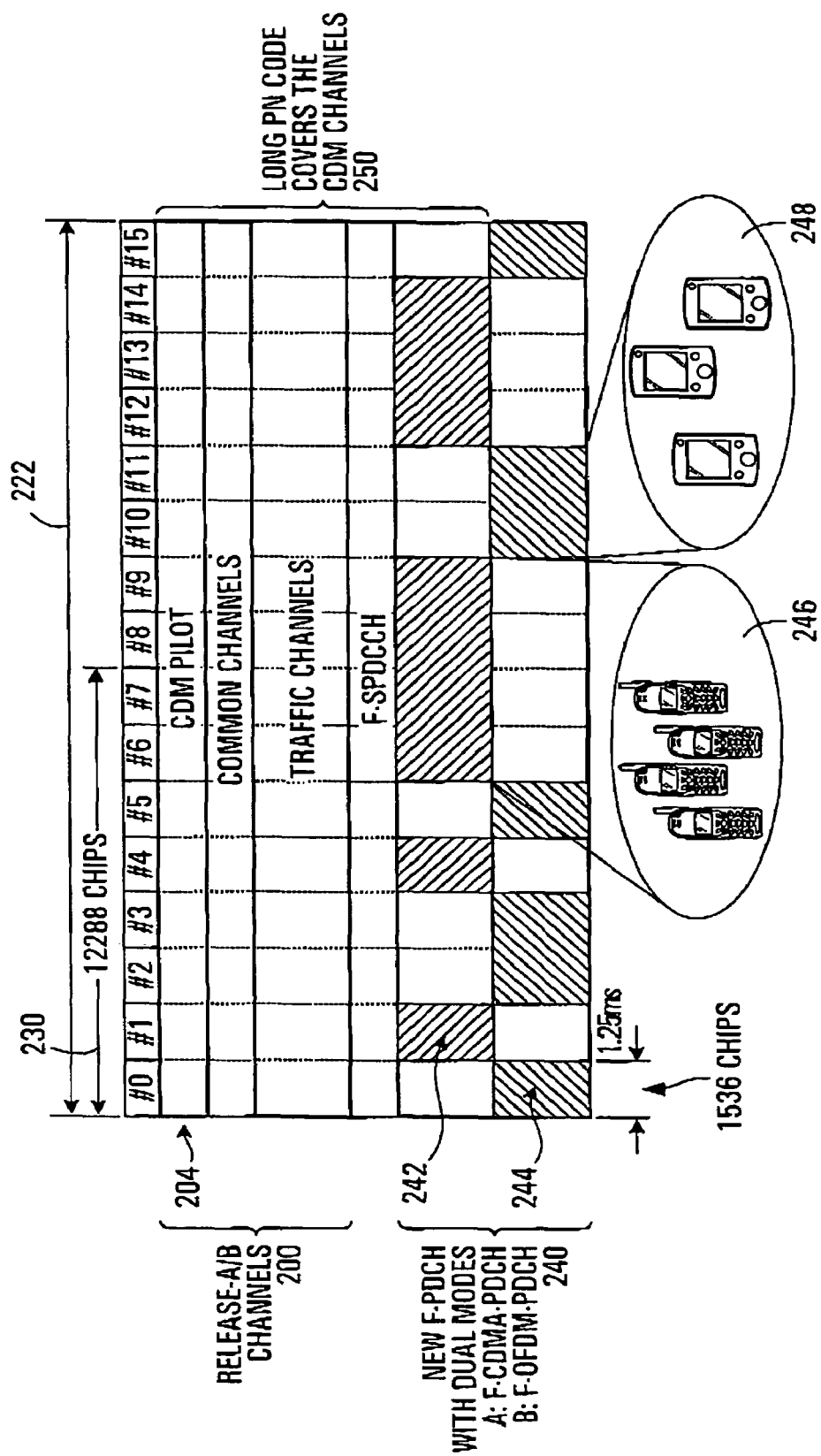
FIG. 15 is a new channel structure featuring an OFDM mode provided by an embodiment of the invention.

FIG. 15 shows a preferred embodiment of a new OFDM mode for use in a forward packet data channel (F-PDHC). The embodiment is designed to allow bandwidth compatibility with 1xEV-DV, and as such a specific frame structure is proposed. However, the invention is not limited to the particular frame structure, particularly if no compatibility is required. Enhancements and further embodiments relating to this embodiment will be described with reference to FIGS. 16 to 21. Shown in FIG. 15 are the conventional release-A/B channels 200 introduced to previously with reference to FIG. 14 which consist of a CDM pilot 204, common channels and traffic channels. Also shown is the new forward packet data channel 240 having dual modes, one of which is OFDM 242 and the other one of which is CDMA 244. The forward packet data channel 240 is used to transmit scheduled packet content. In the illustrated example, the overall frame is 20 milliseconds in duration and contains 16 slots each of which is 1.25 milliseconds in duration. Each slot contains 1536 chips. As in the first set of embodiments, the OFDM frame is preferably mapped onto the CDMA signal such that the chip by chip summing can be performed, and such that timing derived from the CDMA signal can be used for the OFDMA signals as well. Other slot sizes and frame sizes can alternatively be employed. In one embodiment, each slot can be scheduled to be either transmitting the packet data channel in CDMA mode or in OFDM mode, but not in both. In another embodiment, both CDMA and OFDM mode transmission is allowed simultaneously during a single slot. In yet another embodiment, there is no CDMA for the forward packet data channel.

A single long PN code (not shown) is provided which covers all of the CDMA channels including the standard release-A/B channels 200 and the forward packet data channel in CDMA mode 244. There is no long PN code which is used to cover the OFDM channel 240. Also shown is an F-SPDCCH (forward secondary packet data control channel) channel 249 which is a control channel that is used to schedule the CDMA packet channel 244. Preferably, a flag is provided to indicate for a given slot that OFDM mode is being used. Other than this flag, the structure of this channel preferably is the same as the existing F-SPDCCH provided for in the CDMA systems (channel 218 of FIG. 14).

Figure 16:
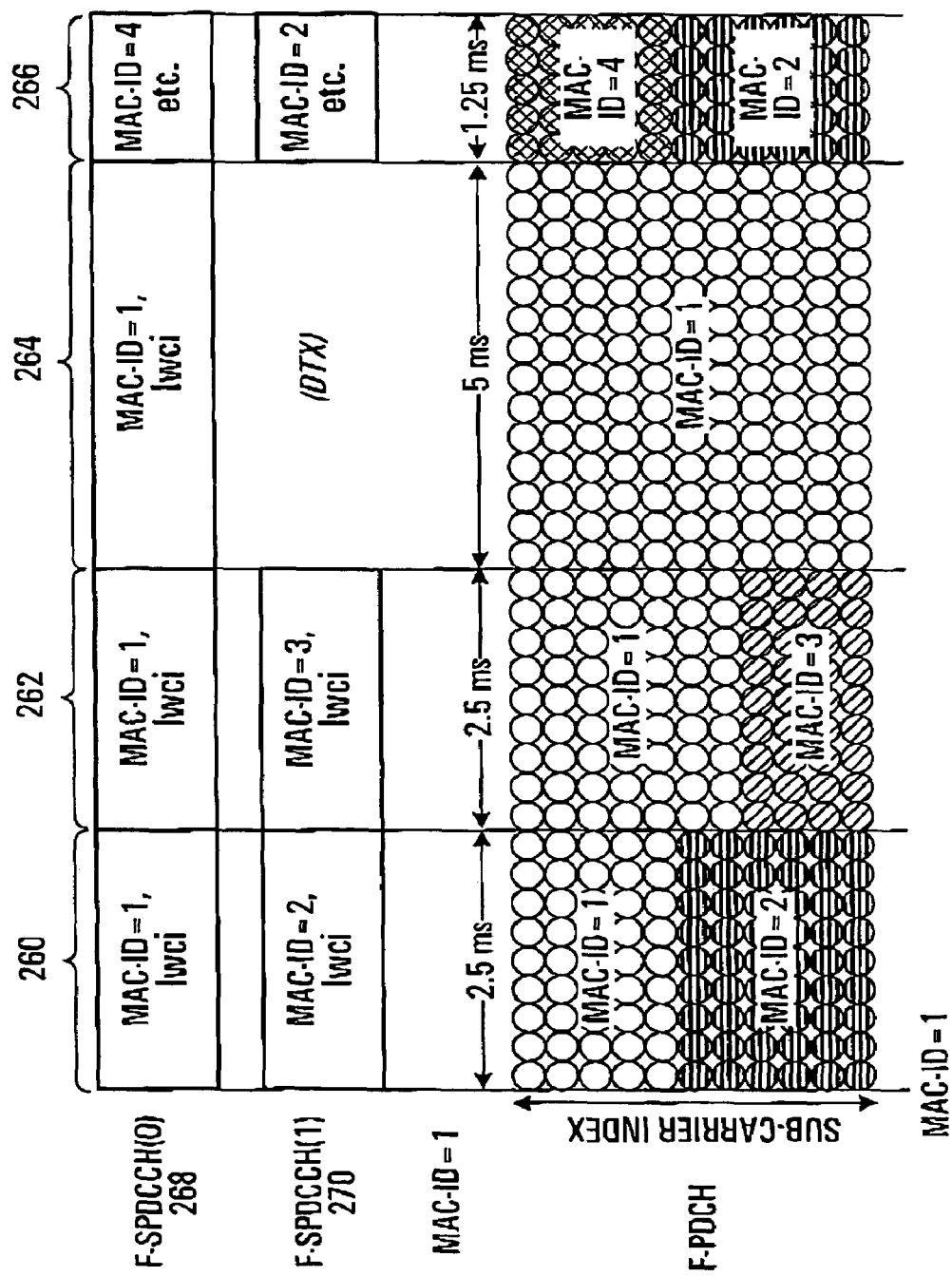
FIG. 16 illustrates a method of reuse of the F-SPDCCH channel for OFDM time-frequency plane allocation in accordance with an embodiment of the invention.

In some embodiments, the OFDM time-frequency plane is allocable dynamically to one or more users/receivers during a given slot. An example of this is illustrated in FIG. 16 where 9 1.25 milliseconds slots are shown, these consisting of a first group 260 of two slots, a second group 262 of two slots, a group 264 of five slots, and a final slot 266. During each group of slots, the sub-carriers used for OFDM mode forward packet data channel are allocatable to one or two users. Other numbers of users could be supported. The particular users for which capacity is to be allocated are identified by MAC-ID's, one for each user. In the illustrated example, four different MAC-ID's are employed, namely, MAC-ID=1, 2, 3, 4. The F-SPDCCH contains two sub-channels 270, 272 for identifying the users to be scheduled during a given slot. The first sub-channel 268, namely F-SPDCCH(0) identifies a MAC-ID of a first user. The second sub-channel 270, namely F-SDPCCH(1) identifies the MAC-ID of a second user when present. When there is no second user, preferably the second sub-channel 270 is not transmitted to save transmit power. In the illustrated example, during the first two slots the first sub-channel indicates MAC-ID=1 and the second sub-channel indicates MAC-ID=2. Furthermore, for each MAC-ID there is a field indicated to be "LWCI" which stands for Last Walsh Code Indicator. This is taken from the F-SPDCCH channel usage for CDMA. For OFDM applications however, this is preferably used to indicate the last sub-carrier index for the particular user. Thus, the available sub-carriers can be dynamically assigned between two users, and moreover the particular sub-carriers to be assigned can also be dynamically determined. Of course, it can easily be seen how this approach can be extended to handle the data of more than two users during a given slot.

In the illustrated example, the F-PDCH has 11 sub-carriers (this being arbitrary, only for the purpose of illustration) having sub-carrier index 272 from 1 to 11.

For the first two slots 260 of FIG. 5, the first 5 sub-carriers are used for MAC-ID=1 and the next 6 sub-carriers are used for MAC-ID=2.

Continuing with the example, during the next two slots 262 MAC-ID=1 identifies the first user, and that user is given the first seven sub-carriers. MAC-ID=3 identifies the second user and that user is given the last four sub-carriers.

During the next four slots 264, only a single user is transmitting, namely the user with MAC-ID=1. During the last slot 266, MAC-ID=4 and MAC-ID=2 identify two users.

Preferably, the F-SPDCCH sub-channels are spread and transmitted as CDMA channels. In this example, each sub-channel transmits a respective MAC-ID and a respective last Walsh code indicator in each slot. This is a very specific method of conveying this control information to receivers. More generally, when sub-carrier allocation is to be employed, any appropriate method of instructing the receivers to look in particular slots and at specific sub-carriers can be employed. The illustrated example has assumed only two users can be scheduled per slot, and that there are eleven sub-carriers to use. More generally, any appropriate number of sub-carriers can be used, and any appropriate number of users can be scheduled. Particular numbers of sub-carriers may be more amenable to being overlaid over the CDMA signals than others.

It is noted that in the above where is it mentioned the user is transmitting, what is meant is that data for that user is being transmitted over the shared channel from a network transmitter such as a base station.

Figure 17:
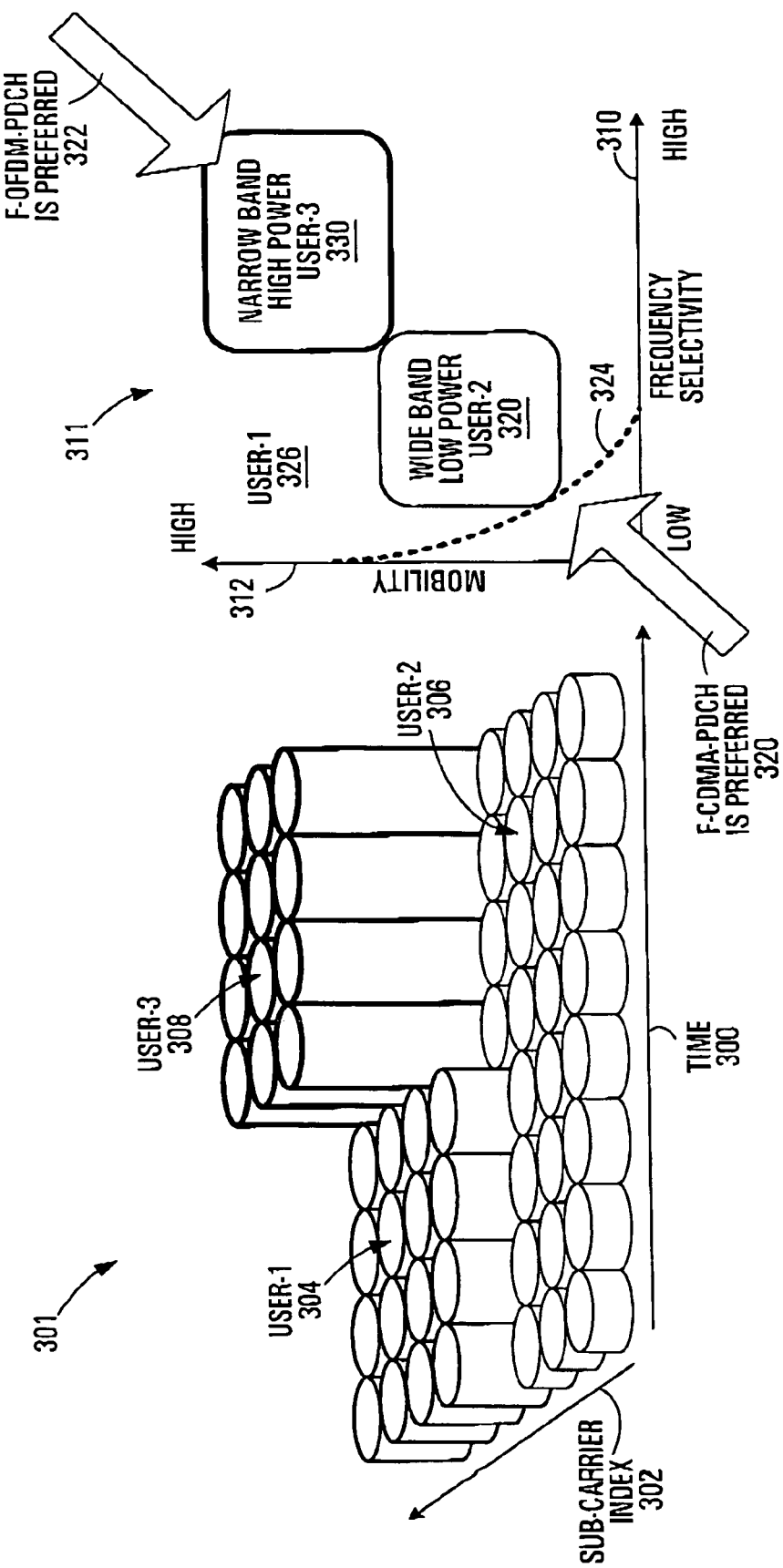
FIG. 17 shows an example of how sub-carrier power allocation can be performed based on the user channel condition for F-OFDM-PDCH.

In a preferred embodiment, the new forward OFDM packet data channel allows sub-carrier power allocation based on user channel conditions. Referring to FIG. 17, shown in the right part of the figure is a mobility-frequency-selectivity chart 311 which maps frequency selectivity 310 and mobility 312 to preferred operating conditions. For high frequency selectivity and mobility, preferably the OFDM packet data channel is used, and a narrow band is employed with high power. The dotted line 324 represents the transition between conditions where OFDM is preferred and where CDMA is preferred. In the lower left hand corner above the dotted line 324, where frequency selectivity is lower and mobility is lower, it is preferred still that OFDM is employed, but with a wide band and low power. For users outside the two particular ranges, an intermediate band and an intermediate power are preferably employed.

The left part of FIG. 17 shows an example of sub-carrier and power allocation 301. One axis 302 is for sub-carrier index, and the other axis 300 is for time. The radial axis (not shown) is for power. An example of sub-carrier and power allocation for the users, user-1, user-2 and user-3 is shown. User-1 is shown to have a position 326 in the mobility-frequency selectivity chart 311 indicating high mobility but relatively low frequency selectivity. For this user, a wide band medium power transmission is preferably used as indicated by the sub-carrier allocation 304 in the sub-carrier power allocation 301. This shows that four different sub-carriers are used to transmit during four different OFDM symbols. For the second user, user-2 which is operating with both low mobility and low frequency selectively but not so low that CDMA is preferred as indicated by position 328 on the mobility-frequency selectivity chart 311, the sub-carrier and power allocation 301 shows sub-carriers 306 for this user consisting of three or four different sub-carriers are used but over a longer period of time and with lower power. The number of sub-carriers allocated to user-2 changes from three to four after the fourth OFDM symbol in the example. Finally, for the third user, user-3 who has both high frequency selectivity and high mobility as indicated by position 330 in the mobility-frequency selectivity chart 311, a sub-carrier power allocation 308 of only two sub-carriers is employed, but with a high power and as such a narrow band high power signal is being transmitted.

Preferably, there will be a total power budget for the OFDM packet data channel, and the total power can be manipulated between the sub-carriers to provide the best operating conditions for all users. It is noted that some mechanism for determining a metric representative of mobility and frequency selectivity at the base station may be needed for this embodiment. In one embodiment, each mobile terminal measures this and feeds one or more parameters back to the base station.

Figure 18:
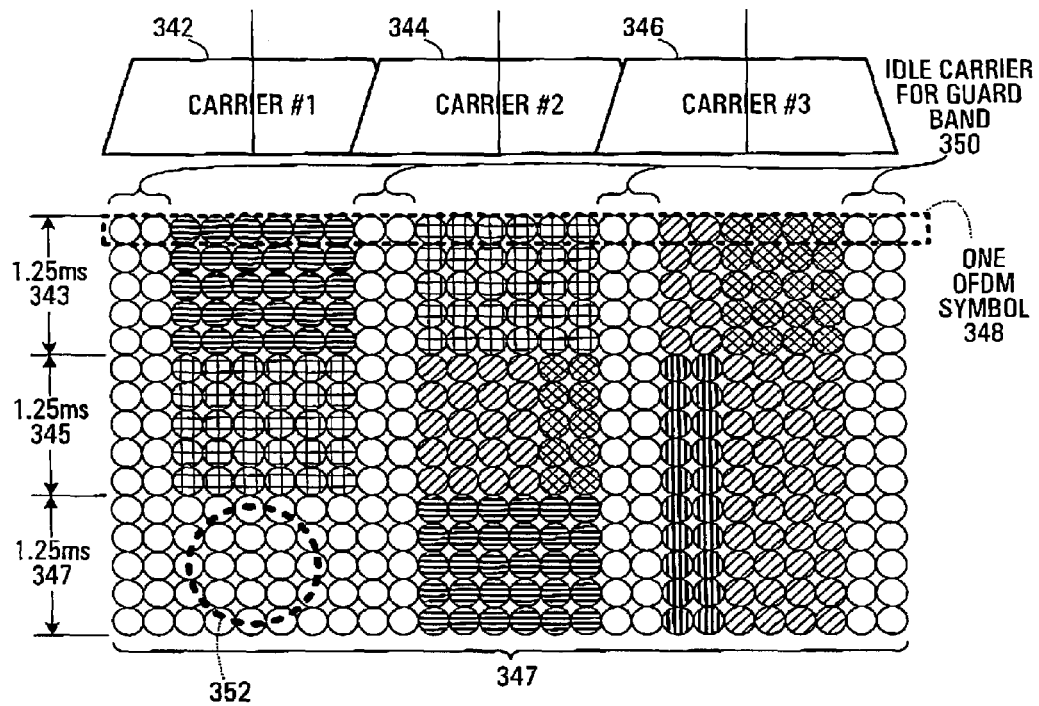
FIG. 18 illustrates a preferred method of mapping the F-OFDM-PDCH onto a multi-carrier environment.

In another embodiment, the forward OFDM packet data channel is adapted for use in a multi-carrier CDMA system. In a preferred embodiment, rather than computing a respective IFFT for each of a respective OFDM signal to be transmitted on each carrier, a single wide band IFFT is used to extract and modulate all sub-carriers at both the transmitter and the receiver. This is best illustrated by way of example, and one example is shown in FIG. 18. In this example, there is a multi-carrier CDMA system having three carriers 342, 344, 346 labeled carrier #1, carrier #2 and carrier #3. A large set 347 of OFDM sub-carriers is shown to span the bandwidth of all three carriers. In the illustrated example, this set 347 is shown to include 26 sub-carriers, which span all three carriers. It is to be understood that different numbers of carriers and different numbers of sub-carriers can be employed within the scope of the invention. Preferably, the OFDM system is designed to perform a single IFFT function at the transmitter for all 26 sub-carriers. Similarly, at the receiver the OFDM system is designed to perform a single FFT function for all 26 sub-carriers. Preferably, one or more idle carriers are inserted to provide a guard band between the carriers. In the illustrated example, OFDM symbol 348 has actual data on 6 sub-carriers in the band of carrier #1, 6 sub-carriers in the band of carrier #2, and data on 6 sub-carriers in the band of carrier #3. Two sub-carrier guard bands 350 are shown as well. In the illustrated example, 1.25 ms slots contain 5 OFDM symbols each of which is a 26 point FFT. A specific number of symbols per slot, carriers and sub-carriers per carrier has been shown in the illustrated example. More generally, it can be seen how a single IFFT can be used to modulate some number of sub-carriers to some number of carriers.

In some embodiments, the OFDM and CDMA modes are assignable on a per carrier basis. Then, if a given carrier is to be used to transmit CDMA rather than OFDM, all that needs to be done is to insert zeros in the OFDM signal for the sub-carriers which are representative of that carrier. FIG. 18 also shows an example of this. In the illustrated example, three 1.25 millisecond slots are shown. During the first slot 347 (the bottom most slot) carrier #1 is being use to transmit CDMA, the CDMA spectrum being indicated at 352. Carrier #2 and carrier #3 are used to transit OFDM, and moreover the sub-carriers are allocated between three different OFDM users. In the illustrated example, there are also guard bands between the sub-carriers used for different carriers. This is realized by inserting zeros at the input to the IFFT function. Thus, to perform the IFFT for the first slot 347, zeros would be inserted for all the sub-carriers associated with carrier #1, and for the guard bands, the data for the first user is inserted for the six sub-carriers of carrier #2, data for the second user is inserted for two of the six sub-carriers of carrier #3, and data for a third user is transmitted on four sub-carriers of carrier #3. Preferably, all of this is dynamically assignable on a per-slot basis. For example, in the second slot 345 (the middle slot of FIG. 18) all three carriers are used for OFDM. In the illustrated example, the 6 sub-carriers of the first carrier are used for a first user, four sub-carriers of the second carrier and four sub-carriers of the third carrier are used for a second user, two sub-carriers of the second carrier are used for a third user and two sub-carriers of the third carrier are used for a forth user.

Preferably, for single or multiple carrier systems, the OFDM sub-carriers are partitioned between multiple users every partitioning period. A partitioning period may be a single OFDM symbol, or may be a longer period.

Furthermore, as indicated above, for multiple carrier systems preferably each carrier is allocated to only one of CDMA or OFDM, and this is done on a per allocation period basis, and for any carrier that is allocated to CDMA during a given allocation period, zeros are inserted in a portion of the OFDM IFFT that overlaps the carrier during that allocation period. The allocation period can be any appropriate time and may be static or variable, a single slot, or some longer time.

Figure 19:
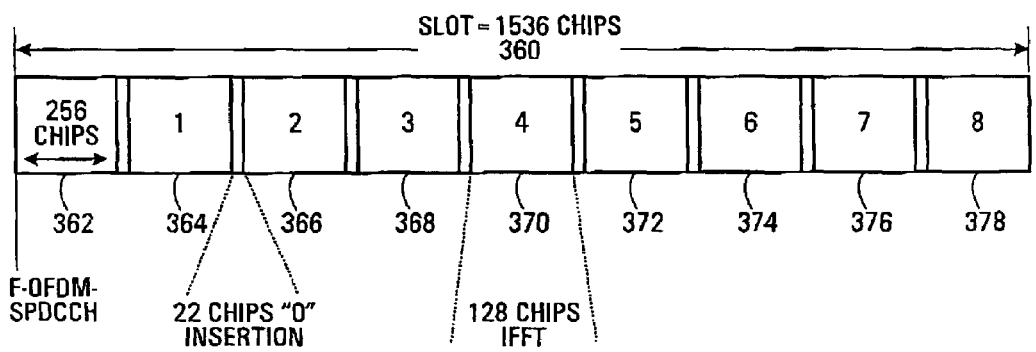
FIG. 19 is an example of an F-OFDM-PDCH structure provided by an embodiment of the invention.

An example slot structure for the OFDM packet data channel is shown in FIG. 19. In this case, a 1.25 milliseconds slot 360 (1536 chips and duration) begins with a 256 chip OFDM SPDCCH 362 followed by 8 OFDM 128 chip FFT's 364, 366, 368, 370, 372, 374, 376, 378 between each of which there is a 22 chip "0" insertion that functions as a prefix. Preferably, the F-OFDM SPDCCH is used to indicate which users are scheduled for OFDM transmission, and which sub-carriers, as discussed in detail above. The 22-chip insertion is used for the prefix, as is well known for OFDM. Alternatively, low rate reliable data can be transmitted during these periods. The use of the prefix allows the removal of inter-symbol interference.

Figure 20:
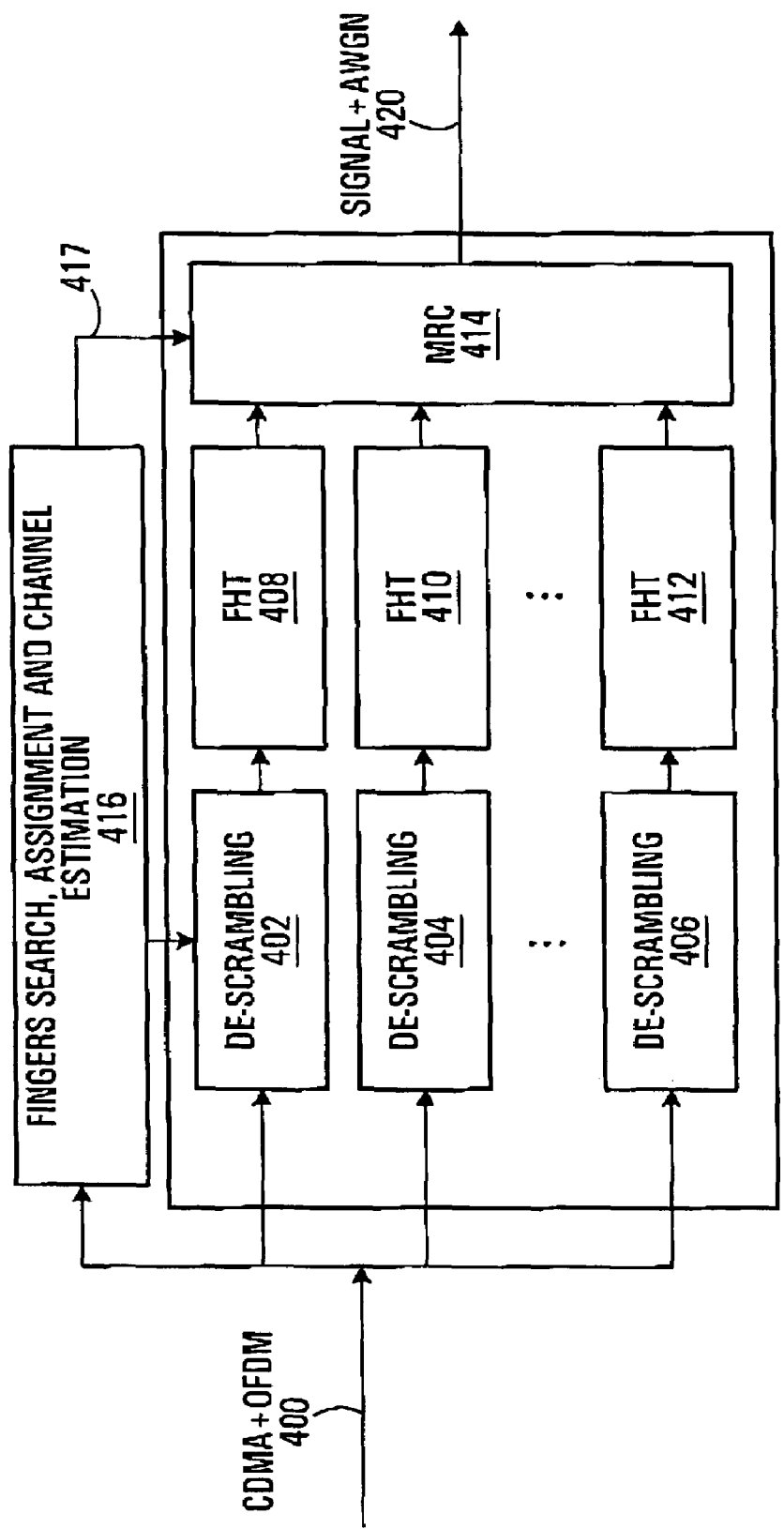
FIG. 20 shows a block diagram of CDMA mode reception in the presence of F-OFDM-PDCH.

It is to be understood that the OFDM signals will act as interference to the existing CDMA mode reception. An example of CDMA mode reception in the presence of the F-OFDM Packet data channel is illustrated in FIG. 20. The CDMA plus OFDM signals are input to the de-scrambling functions 402, 404, 406 (one for each multi-part component), which then de-spreads with the fast Hadamard transforms 402, 410, 412. Finger search synchronization and channel estimation 416 is used to find the multi-path components to be de-scrambled. Then, maximum ratio combining is performed. The de-scrambling, FHT and MRC are all conventional rake receiver functions. The output 420 of this process is the desired signal plus additive white Gaussian. This is because the OFDM signal was not scrambled using the PN code that was used in scrambling the remainder of the signal, and as such when the input signal is de-scrambled, the effects of the OFDM signal become noise.

It is noted that in the example implementations the spreading gain introduced by the CDMA system will provide a 15 DB gain over the power level of the OFDM signal, and as such the OFDM signal is negligible. More generally, the spreading gain of the CDMA signal and the power level of the OFDM signal should be considered together to ensure acceptable performance for the CDMA signals.

Figure 21:
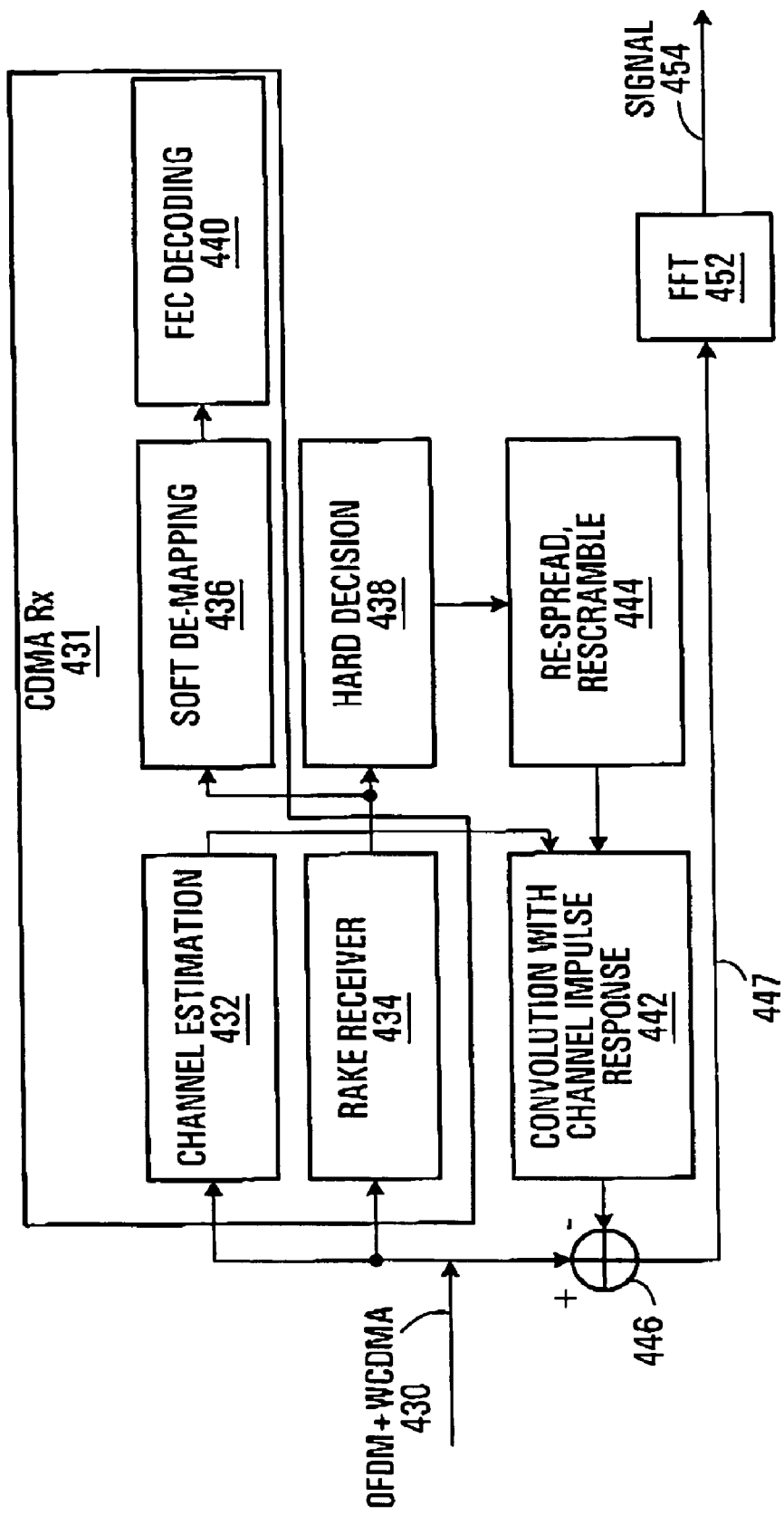
FIG. 21 shows a block diagram of F-OFDM-PDCH mode reception in the presence of WCDMA signals.

Similarly, the CDMA signals will act as interference to the OFDM signals when they are received. An example implementation for forward OFDM Packet data channel mode reception is shown in FIG. 21. For this embodiment, the signal 430, again containing OFDM and CDMA is input into the receiver. Part of the receiver is a conventional CDMA receiver which performs channel estimation 432 in the time domain and rake reception 434 followed by soft de-mapping 436 and Forward Error Correction decoding 440. The output of the Rake receiver 439 is also fed to a hard decision block 438 which makes hard decisions on the received data without decoding them. These hard decisions are then re-spread and re-scrambled 444. This is then convolved 442 with the channel response to give a time domain estimate 443 of the contribution to the received signal due to the CDMA component. This estimate 443 is then subtracted from the overall received signal 430 to give an estimated OFDM component 447, which is then demodulated using conventional OFDM reception techniques 452. Thus, a form of interference cancellation is employed to remove the effects of the CDMA from the OFDM signals at the receiver.

Another embodiment provides a method of controlling the power control of CDMA such that the interference introduced by the OFDM channel will not result in "power control panic". When an OFDM slot is scheduled, this is not orthogonal to the existing CDMA signals. It is noted that if the condition is flat fading, it is preferred that rather than transmitting OFDM, CDMA is sent. This is because in a flat fading condition, CDMA exhibits the same performance as OFDM, but has the benefit of also being orthogonal with the existing CDMA channel. Thus, in sufficiently flat fading conditions, packet data is preferably sent using the CDMA mode.

On the other hand, if a channel is dispersive, the orthogonality between the different channels of CDMA including CDMA packet data channel will be lost. Thus, the expected orthogonality will not result in the expected interference reduction. In such a channel, OFDM is good. It fixes the bad channel, but will also introduce some degree of interference with existing CDMA systems. This interference will be bursty in nature. This will have two impacts upon the existing CDMA channels. There will not be much of an effect on the common channels because there is a large spreading factor employed for these channels. However, it will effect the power control channels such as the voice channels. This may cause power control loop panic as the voice channels try to increase their transmit power to overcome the interference introduced by the OFDM. According to a preferred embodiment of the invention, the transmitter fixes the power control panic by changing the power control parameters to avoid this power control panic ahead of time. In one embodiment, this simply involves changing the outer loop power control thresholds ahead of the transmission of OFDM packet data transmissions.

It is noted that for current release A/B/C, Walsh space exhaustion results in a fundamental limit upon capacity. According to a preferred embodiment, the forward OFDM packet data channel can be treated as a solution for Walsh space extension. In this case, the packet data is mapped into Fourier space. Thus, the Walsh code limit is changed by the introduction of the additional Fourier space in the same transmit bandwidth. Effectively, additional dimensions are provided even after the Walsh space has been exhausted.

A preferred service partition is to map a Walsh space onto all release A/B Channels and to use the Fourier space for the forward packet data channel.

As discussed above, in a preferred embodiment, an intelligent decision is made as to which user and which sub-carriers are to be transmitted in OFDM mode. In an example method making such an intelligent decision, a CDMA correlator is first used to search rake fingers and to measure the channel impulse response. The FFT of a channel impulse response is taken, and a first through nth order moments of this FFT are also computed. Based on these moments, the frequency-selectivity and mobility of the channel can be determined. As a function of the frequency-selectivity and mobility, the sub-carrier and power allocation are performed. Channel quality indicator for CDMA and OFDMA may also be computed. The channel quality indicators will determine whether or not OFDM mode or CDMA mode is to be scheduled, and the sub-carrier and power allocation is performed in the event that OFDM is scheduled. Other methods of deciding which of OFDM or CDMA may be employed.

Finally, it is noted that for MIMO applications, it is preferred that OFDM is employed for a MIMO based forward packet data channel. The CDMA channels can be mapped onto non-MIMO channels.

In another embodiment, a combined CDMA/OFDM downlink structure is provided that is data only (DO). This embodiment can be described with reference to the drawings used for the non-data only embodiments. In a DO embodiment corresponding to the FIG. 2 WCDMA-based embodiment, there is no DCH 16. In a DO embodiment corresponding to the FIG. 15 CDMA-2000-based embodiment, there are no traffic channels.

Numerous modifications and variations of the present invention are possible in light of the above teachings. It is therefore to be understood that within the scope of the appended claims, the invention may be practiced otherwise than as specifically described herein.

We claim:

1. A transmitter comprising:
a CDMA (code divisional multiple access) modulator configured to generate at least one code separated CDMA (code division multiple access) channel(s) that are scrambled with a common scrambling code;
an OFDM (orthogonal frequency division multiplexing) modulator configured to generate an OFDM packet channel, the OFDM packet channel being divided into OFDM slots during which OFDM signals are transmitted with capacity allocated on a per OFDM slot basis, the OFDM packet channel not being scrambled by the common scrambling code;
a combiner to combine the CDMA channels and the OFDM packet channel to generate a downlink signal;
at least one antenna to transmit the downlink signal.

2. A transmitter according to claim 1 wherein the at least one code separated CDMA channel(s) comprises at least one continuous CDMA channels and a CDMA packet channel that is divided into CDMA slots during which CMDA signals are transmitted with capacity allocated on a per CDMA slot basis.

3. A transmitter according to claim 1 wherein the at least one code separated CDMA channel(s) comprises a CDMA packet channel that is divided into CDMA slots during which CMDA signals are transmitted with capacity allocated on a per CDMA slot basis.

4. The transmitter according to claim 2 adapted to transmit packet data on a sequence of slots, each slot being either an OFDM slot or a CDMA slot, but not both.

5. The transmitter according to claim 2 adapted to transmit packet data on a sequence of slots, each slot being an OFDM slot and/or a CDMA slot.

6. The transmitter according to claim 1 further adapted to transmit periodically at least one CDMA signalling channel that is not spread by the scrambling code.

7. The transmitter according to claim 6 wherein during periods of overlap between the transmission of the at least one signalling channel and the transmission of an OFDM slot, the OFDM slot transmits zeros or known data so that those periods can be treated as a prefix for the OFDM slots upon reception.

8. The transmitter according to claim 1 wherein each OFDM slot comprises:
a prefix followed by an IFFT (Inverse Fast Fourier Transform) period, followed by a suffix.

9. The transmitter according to claim 8 wherein each OFDM slot is 10/15 ms in duration, and wherein the prefix is 128 chips, the IFFT period is 2304 chips, and the suffix is 128 chips.

10. The transmitter according to claim 8 wherein the IFFT period comprises: a plurality of IFFTs separated by zero insertions.

11. The transmitter according to claim 10 wherein the IFFT period comprises 18 128-chip IFFTs.

12. The transmitter according to claim 8 wherein the prefix is a designed training sequence.

13. The transmitter according to claim 6 wherein the at least one signalling channel is transmitted during the prefix of the OFDM slots, and wherein the OFDM slots transmit zeros during the prefix so that the OFDM channel does not interfere with the at least one signalling channel.

14. The transmitter according to claim 2 further adapted to transmit a control channel that identifies to receivers which OFDM slots and/or which CDMA slots are for a given receiver.

15. The transmitter according to claim 8 adapted to transmit a control channel during the suffix that identifies to receivers which OFDM slots and/or which CDMA slots are for a given receiver.

16. The transmitter according to claim 11 wherein the control channel contains a receiver specific mask and/or a receiver specific CRC (cyclic redundancy check) code.

17. The transmitter according to claim 1 wherein each OFDM slot comprises in sequence:
a first prefix; a first IFFT (Inverse Fast Fourier Transform) period, a first suffix; a second prefix, a second IFFT period, and a second suffix.

18. The transmitter according to claim 17 wherein each OFDM slot is 10/15 ms in duration, and each prefix is 128 chips, each IFFT period comprises 16 64 chip IFFTs, and each suffix is 128 chips.

19. A system comprising:
a transmitter comprising:
a CDMA (code divisional multiple access) modulator configured to generate at least one code separated CDMA channel(s) that are scrambled with a common scrambling code;
an OFDM (orthogonal frequency division multiplexing) modulator configured to generate an OFDM packet channel, the OFDM packet channel being divided into OFDM slots during which OFDM signals are transmitted with capacity allocated on a per OFDM slot basis, the OFDM packet channel not being scrambled by the common scrambling code:
a combiner to combine the CDMA channels and the OFDM packet channel to generate a downlink signal;
at least one antenna to transmit the downlink signal;
the transmitter in combination with a plurality of receivers at least one of which is an OFDM-capable receiver, wherein each OFDM-capable receiver demodulates the CDMA channels on an ongoing basis, and each OFDM-capable receiver demodulates a given OFDM slot only if scheduled during the OFDM slot.

20. A system comprising:
a transmitter comprising:
a CDMA (code divisional multiple access) modulator configured to generate at least one code separated CDMA channel(s) that are scrambled with a common scrambling code;
an OFDM (orthogonal frequency division multiplexing) modulator configured to generate an OFDM packet channel, the OFDM packet channel being divided into OFDM slots during which OFDM signals are transmitted with capacity allocated on a per OFDM slot basis, the OFDM packet channel not being scrambled by the common scrambling code;
a combiner to combine the CDMA channels and the OFDM packet channel to generate a downlink signal;
at least one antenna to transmit the downlink signal;
wherein the at least one code separated CDMA channel(s) comprises at least one continuous CDMA channel and a CDMA packet channel that is divided into CDMA slots during which CMDA signals are transmitted with capacity allocated on a per CDMA slot basis;
the transmitter in combination with a plurality of receivers at least one of which is an OFDM-capable receiver, and each OFDM-capable receiver demodulates a given OFDM slot only if scheduled during the OFDM slot, and each receiver demodulates a given CDMA slot only if scheduled during the CDMA slot.

21. The transmitter of claim 1 further comprising a scheduler adapted to schedule receivers on the downlink by:
for each of a plurality of OFDM-capable receivers, obtaining a respective channel quality indicator for CDMA slots and/or for OFDM slots;
scheduling transmission to OFDM-capable receivers on CDMA and/or OFDM slots according to the channel quality indicators.

22. The transmitter of claim 21 wherein for a given receiver, the channel quality indicator for CDMA slots and/or for OFDM slots comprises a better of the CDMA channel quality indicator and the OFDM channel quality indicator as determined by the receiver.

23. The transmitter of 15 wherein the scheduler is further adapted to:
for CDMA-only capable receivers, obtain a channel quality indicator for the CDMA slots only, and schedule transmission to CDMA-only capable receivers on the basis of the CDMA channel quality indicator.

24. The transmitter of claim 1 further adapted to:
for at least some of the OFDM slots, partition OFDM sub-carriers transmitted during at least some of the OFDM slots between a plurality of receivers on a partitioning period basis.

25. The transmitter of claim 24 wherein a partitioning period comprises one OFDM slot.

26. A transmitter according to claim 25 further adapted to transmit a control channel identifying how each OFDM slot is partitioned between receivers such that each receiver can obtain its content.

27. A transmitter according to claim 26 wherein the control channel comprises:
identifiers for each receiver scheduled during the slot and an indication of which sub-carriers are for which receiver.

28. The transmitter according to claim 27 wherein the control channel comprises:
a first sub-channel and a second sub-channel;
the first sub-channel containing an identifier of a first receiver and an identifier of a last OFDM sub-carrier for the first receiver;
the second sub-channel containing an identifier of a second receiver, and an identifier of a last OFDM sub-carrier for the second receiver, the second sub-channel being only transmitted when there is a second receiver scheduled during a given slot.

29. The transmitter according to claim 24 further adapted to perform sub-carrier and power allocation.

30. The transmitter according to claim 29 adapted to perform sub-carrier and power allocation dynamically as a function of mobility and/or frequency selectivity.

31. The transmitter according to claim 29 further adapted to perform sub-carrier and power allocation dynamically as a function of mobility and frequency selectivity by:
defining conditions in which CDMA is used instead of OFDM as a function of channel quality and/or mobility and/or frequency selectivity;
when conditions indicate OFDM is to be used:
a) using a narrow frequency band and high power for high mobility, high frequency selectivity users;
b) using a wide frequency band and low power for mid-mobility and mid-frequency selectivity users.

32. The transmitter according to claim 29 further adapted to perform OFDM allocation subject to an overall power budget for an OFDM slot.

33. The transmitter according to claim 1 adapted for use in a multiple carrier CDMA system.

34. The transmitter according to claim 33 comprising:
an OFDM modulator adapted to generate a single set OFDM sub-carriers that spans the multiple carriers, and in which a single wideband IFFT (Inverse Fast Fourier Transform) is performed to do OFDM modulation.

35. The transmitter according to claim 33 wherein each carrier is allocated to only one of CDMA or OFDM on a per allocation period basis, and for any carrier that is allocated to CDMA during a given allocation period, zeros are inserted in a portion of the OFDM IFFT that overlaps the carrier during that allocation period.

36. The transmitter according to claim 35 wherein the OFDM modulator is adapted to insert guard band sub-carriers between groups of sub-carriers for each carrier.

37. The transmitter according to claim 1 wherein each OFDM slot comprises:
a control portion which is non-OFDM followed by a plurality of IFFTs (Inverse Fast Fourier Transform) each separated by a respective prefix.

38. The transmitter according to claim 37 wherein each IFFT is a 128 chip IFFT, and each prefix is 22 zero chips.

39. The transmitter according to claim 1 further adapted to:
adjust at least one power control parameter prior to transmitting OFDM slots so as to avoid/mitigate power control loop panic.

40. The transmitter according to claim 39 wherein the at least one power control parameter comprises an outer loop power control threshold.

41. The transmitter of claim 2 adapted to preferentially transmit CDMA slots in flat fading conditions.

42. The transmitter of claim 2 adapted to preferentially transmit OFDM slots in dispersive conditions.

* * * * *

UNITED STATES PATENT AND TRADEMARK OFFICE
CERTIFICATE OF CORRECTION

PATENT NO. : 7,471,932 B2 Page 1 of 1
APPLICATION NO. : 10/915393
DATED : December 30, 2008
INVENTOR(S) : Shiquan Wu et al.

It is certified that error appears in the above-identified patent and that said Letters Patent is hereby corrected as shown below:

Column 19, claim 2, line 41, "...CMDA..." should be --...CDMA...--;
Column 19, claim 3, line 47, "...CMDA..." should be --...CDMA...--;
Column 20, claim 19, line 49, "...code:..." should be --...code;...--; and
Column 21, claim 20, line 11, "...CMDA..." should be --...CDMA...--.

Signed and Sealed this

Twenty-second Day of September, 2009

David J. Kappos
*Director of the United States Patent and Trademark Office*